(12) United States Patent
Florissi et al.

(10) Patent No.: US 10,505,863 B1
(45) Date of Patent: Dec. 10, 2019

(54) MULTI-FRAMEWORK DISTRIBUTED COMPUTATION

(71) Applicant: EMC IP Holding Company LLC, Hopkinton, MA (US)

(72) Inventors: Patricia Gomes Soares Florissi, Briancliff Manor, NY (US); Ofri Masad, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 15/799,389

(22) Filed: Oct. 31, 2017

Related U.S. Application Data

(63) Continuation-in-part of application No. 14/982,341, filed on Dec. 29, 2015, now Pat. No. 10,015,106.

(60) Provisional application No. 62/143,404, filed on Apr. 6, 2015, provisional application No. 62/143,685, filed on Apr. 6, 2015.

(51) Int. Cl.
  *H04L 12/911* (2013.01)
  *H04L 29/08* (2006.01)
  *G06Q 10/06* (2012.01)
  *G06Q 30/02* (2012.01)

(52) U.S. Cl.
  CPC ............. *H04L 47/70* (2013.01); *H04L 67/10* (2013.01); *G06Q 10/06313* (2013.01); *G06Q 30/0283* (2013.01); *H04L 67/2842* (2013.01)

(58) Field of Classification Search
  CPC ......... G06F 17/30424; H04L 29/08135; H04L 67/10
  See application file for complete search history.

(56) References Cited

U.S. PATENT DOCUMENTS

| | | |
|---|---|---|
| 6,112,225 A | 8/2000 | Kraft et al. |
| 6,516,350 B1 | 2/2003 | Lumelsky et al. |
| 7,657,537 B1 | 2/2010 | Corbett |
| 7,934,018 B1 | 4/2011 | Lavallee et al. |
| 7,934,248 B1 | 4/2011 | Yehuda et al. |
| 8,224,825 B2 | 7/2012 | Wang et al. |
| 8,392,564 B1 * | 3/2013 | Czajkowski ........ H04L 41/5051 709/226 |

(Continued)

OTHER PUBLICATIONS

X. Wu et al., "Privacy Preserving Data Mining Research: Current Status and Key Issues," Proceedings of the 7th International Conference on Computational Science, Part III: ICCS 2007, May 2007, pp. 762-772.

(Continued)

*Primary Examiner* — Shean Tokuta
(74) *Attorney, Agent, or Firm* — Ryan, Mason & Lewis, LLP

(57) ABSTRACT

A computing device of a data zone includes a persistent storage and a processor. The persistent storage includes a locked data batch of the data zone. The processor obtains an upstream computation request; instantiates a computation framework to process the locked data batch based on a global data batch specified in the upstream computation request; instantiates a downstream computation manager to manage a downstream computation; and instantiates, by the downstream computation manager, a second computation framework in a second computing device of a second data zone to process a second locked data batch of the second data zone.

20 Claims, 13 Drawing Sheets

(56) References Cited

U.S. PATENT DOCUMENTS

| | | |
|---|---|---|
| 8,499,331 B1 | 7/2013 | Yehuda et al. |
| 8,732,118 B1 | 5/2014 | Cole et al. |
| 8,806,061 B1 | 8/2014 | Lobo et al. |
| 8,938,416 B1 | 1/2015 | Cole et al. |
| 9,020,802 B1* | 4/2015 | Florissi ............... G06F 9/445 703/24 |
| 9,031,992 B1 | 5/2015 | Florissi et al. |
| 9,130,832 B1 | 9/2015 | Boe et al. |
| 9,158,843 B1 | 10/2015 | Florissi et al. |
| 9,229,952 B1 | 1/2016 | Meacham et al. |
| 9,235,446 B2* | 1/2016 | Bruno ............... G06F 9/5066 |
| 9,239,711 B1* | 1/2016 | Mistry ............... G06F 9/5072 |
| 9,280,381 B1 | 3/2016 | Florissi et al. |
| 9,338,218 B1 | 5/2016 | Florissi et al. |
| 9,361,263 B1 | 6/2016 | Florissi et al. |
| 9,418,085 B1 | 8/2016 | Shih et al. |
| 9,489,233 B1 | 11/2016 | Florissi et al. |
| 9,678,497 B2 | 6/2017 | Karypis et al. |
| 9,697,262 B2 | 7/2017 | Chandramouli et al. |
| 9,747,127 B1 | 8/2017 | Florissi et al. |
| 9,747,128 B1 | 8/2017 | Vijendra et al. |
| 9,767,149 B2* | 9/2017 | Ozcan ............... G06F 16/2471 |
| 9,832,068 B2* | 11/2017 | McSherry ......... H04L 29/08135 |
| 9,838,410 B2* | 12/2017 | Muddu ............... G06F 16/254 |
| 9,848,041 B2 | 12/2017 | Einkauf et al. |
| 9,996,662 B1 | 6/2018 | Florissi et al. |
| 10,015,106 B1 | 7/2018 | Florissi et al. |
| 10,111,492 B2 | 10/2018 | Florissi et al. |
| 10,114,923 B1 | 10/2018 | Florissi et al. |
| 10,122,806 B1 | 11/2018 | Florissi et al. |
| 10,127,352 B1 | 11/2018 | Florissi et al. |
| 10,270,707 B1 | 4/2019 | Florissi et al. |
| 10,277,668 B1 | 4/2019 | Florissi |
| 10,311,363 B1 | 6/2019 | Florissi et al. |
| 10,331,380 B1 | 6/2019 | Florissi et al. |
| 10,348,810 B1 | 7/2019 | Florissi et al. |
| 2002/0073167 A1 | 6/2002 | Powell et al. |
| 2003/0212741 A1 | 11/2003 | Giasco |
| 2004/0247198 A1 | 12/2004 | Ghosh et al. |
| 2005/0010712 A1 | 1/2005 | Kim et al. |
| 2005/0102354 A1 | 5/2005 | Hollenbeck et al. |
| 2005/0114476 A1 | 5/2005 | Chen et al. |
| 2005/0132297 A1 | 6/2005 | Milic-Frayling et al. |
| 2005/0153686 A1 | 7/2005 | Kall et al. |
| 2005/0165925 A1* | 7/2005 | Dan ............... G06F 9/5083 709/224 |
| 2005/0266420 A1 | 12/2005 | Pusztai et al. |
| 2006/0002383 A1 | 1/2006 | Jeong et al. |
| 2006/0122927 A1 | 6/2006 | Huberman et al. |
| 2006/0126865 A1 | 6/2006 | Blamey et al. |
| 2007/0026426 A1 | 2/2007 | Fuernkranz et al. |
| 2007/0076703 A1 | 4/2007 | Yorieda et al. |
| 2007/0088703 A1 | 4/2007 | Kasiolas et al. |
| 2008/0027954 A1 | 1/2008 | Gan et al. |
| 2008/0028086 A1 | 1/2008 | Chetuparambil et al. |
| 2008/0077607 A1 | 3/2008 | Gatawood et al. |
| 2008/0155100 A1 | 6/2008 | Ahmed et al. |
| 2008/0260119 A1* | 10/2008 | Marathe ............... H04M 7/125 379/93.01 |
| 2008/0279167 A1 | 11/2008 | Cardei et al. |
| 2009/0062623 A1 | 3/2009 | Cohen et al. |
| 2009/0076651 A1 | 3/2009 | Rao |
| 2009/0150084 A1 | 6/2009 | Colwell et al. |
| 2009/0198389 A1 | 8/2009 | Kirchhof-Falter et al. |
| 2009/0310485 A1 | 12/2009 | Averi et al. |
| 2009/0319188 A1 | 12/2009 | Otto |
| 2010/0005077 A1* | 1/2010 | Krishnamurthy ............... G06F 16/24542 707/E17.136 |
| 2010/0042809 A1 | 2/2010 | Schenfeld et al. |
| 2010/0076856 A1 | 3/2010 | Mullins |
| 2010/0122065 A1 | 5/2010 | Dean et al. |
| 2010/0131639 A1 | 5/2010 | Narayana et al. |
| 2010/0184093 A1 | 7/2010 | Donovan et al. |
| 2010/0229178 A1 | 9/2010 | Ito |
| 2010/0250646 A1 | 9/2010 | Dunagan et al. |
| 2010/0290468 A1 | 11/2010 | Lynam et al. |
| 2010/0293334 A1 | 11/2010 | Xun et al. |
| 2010/0299437 A1 | 11/2010 | Moore |
| 2011/0020785 A1 | 1/2011 | Lowery, Jr. et al. |
| 2011/0029999 A1 | 2/2011 | Foti |
| 2011/0103364 A1 | 5/2011 | Li |
| 2011/0145828 A1 | 6/2011 | Takahashi et al. |
| 2011/0314002 A1 | 12/2011 | Oliver et al. |
| 2012/0030599 A1 | 2/2012 | Butt et al. |
| 2013/0035956 A1 | 2/2013 | Carmeli et al. |
| 2013/0044925 A1 | 2/2013 | Kozuka et al. |
| 2013/0054670 A1 | 2/2013 | Keyes et al. |
| 2013/0194928 A1 | 8/2013 | Iqbal |
| 2013/0246460 A1 | 9/2013 | Maltbie et al. |
| 2013/0282897 A1 | 10/2013 | Siegel et al. |
| 2013/0290249 A1 | 10/2013 | Merriman et al. |
| 2013/0291118 A1 | 10/2013 | Li et al. |
| 2013/0318257 A1 | 11/2013 | Lee et al. |
| 2013/0346229 A1 | 12/2013 | Martin et al. |
| 2013/0346988 A1 | 12/2013 | Bruno et al. |
| 2014/0012843 A1 | 1/2014 | Soon-Shiong |
| 2014/0025393 A1 | 1/2014 | Wang et al. |
| 2014/0075161 A1 | 3/2014 | Zhang et al. |
| 2014/0081984 A1* | 3/2014 | Sitsky ............... G06F 16/31 707/741 |
| 2014/0082178 A1 | 3/2014 | Boldyrev et al. |
| 2014/0143251 A1* | 5/2014 | Wang ............... G06F 16/285 707/737 |
| 2014/0173331 A1 | 6/2014 | Martin et al. |
| 2014/0173618 A1 | 6/2014 | Neuman et al. |
| 2014/0280298 A1 | 9/2014 | Petride et al. |
| 2014/0280363 A1 | 9/2014 | Heng et al. |
| 2014/0280604 A1 | 9/2014 | Ahiska et al. |
| 2014/0280990 A1 | 9/2014 | Dove et al. |
| 2014/0310258 A1 | 10/2014 | Tian |
| 2014/0310718 A1 | 10/2014 | Gerphagnon et al. |
| 2014/0320497 A1* | 10/2014 | Vojnovic ............... G06T 11/206 345/440 |
| 2014/0325041 A1 | 10/2014 | Xu et al. |
| 2014/0358999 A1 | 12/2014 | Rabinowitz et al. |
| 2014/0365518 A1 | 12/2014 | Calo et al. |
| 2014/0372611 A1 | 12/2014 | Matsuda et al. |
| 2014/0379722 A1 | 12/2014 | Mysur et al. |
| 2015/0006619 A1 | 1/2015 | Banadaki et al. |
| 2015/0019710 A1 | 1/2015 | Shaashua et al. |
| 2015/0039586 A1 | 2/2015 | Kerschbaum et al. |
| 2015/0039667 A1 | 2/2015 | Shah et al. |
| 2015/0066646 A1 | 3/2015 | Sriharsha et al. |
| 2015/0081877 A1 | 3/2015 | Sethi et al. |
| 2015/0088786 A1 | 3/2015 | Anandhakrishnan |
| 2015/0120791 A1 | 4/2015 | Gummaraju et al. |
| 2015/0121371 A1 | 4/2015 | Gummaraju et al. |
| 2015/0169683 A1 | 6/2015 | Chandramouli et al. |
| 2015/0178052 A1 | 6/2015 | Gupta et al. |
| 2015/0254344 A1 | 9/2015 | Kulkarni et al. |
| 2015/0254558 A1* | 9/2015 | Arnold ............... G06F 16/245 700/19 |
| 2015/0269230 A1 | 9/2015 | Kardes et al. |
| 2015/0277791 A1 | 10/2015 | Li et al. |
| 2015/0278513 A1* | 10/2015 | Krasin ............... G06F 9/5005 726/30 |
| 2015/0295781 A1 | 10/2015 | Maes |
| 2015/0302075 A1 | 10/2015 | Schechter et al. |
| 2015/0339210 A1* | 11/2015 | Kopp ............... G06F 11/3495 718/100 |
| 2015/0355946 A1* | 12/2015 | Kang ............... G06F 9/5072 718/104 |
| 2015/0369618 A1 | 12/2015 | Barnard et al. |
| 2016/0004827 A1 | 1/2016 | Silva et al. |
| 2016/0063191 A1 | 3/2016 | Vesto et al. |
| 2016/0072726 A1 | 3/2016 | Soni et al. |
| 2016/0087909 A1 | 3/2016 | Chatterjee et al. |
| 2016/0098021 A1 | 4/2016 | Zornio et al. |
| 2016/0098472 A1* | 4/2016 | Appleton ............... G06F 16/245 707/737 |
| 2016/0098662 A1 | 4/2016 | Voss et al. |

(56) References Cited

U.S. PATENT DOCUMENTS

| | | | |
|---|---|---|---|
| 2016/0112531 | A1 | 4/2016 | Milton et al. |
| 2016/0132576 | A1 | 5/2016 | Qi et al. |
| 2016/0170882 | A1 | 6/2016 | Choi et al. |
| 2016/0179642 | A1 | 6/2016 | Cai |
| 2016/0179979 | A1 | 6/2016 | Aasman et al. |
| 2016/0182305 | A1 | 6/2016 | Martin et al. |
| 2016/0182327 | A1 | 6/2016 | Coleman, Jr. et al. |
| 2016/0188594 | A1 | 6/2016 | Ranganathan |
| 2016/0196324 | A1* | 7/2016 | Haviv .................. G06F 16/122 707/626 |
| 2016/0205106 | A1 | 7/2016 | Yacoub et al. |
| 2016/0241893 | A1 | 8/2016 | Ahhands et al. |
| 2016/0246981 | A1* | 8/2016 | Nakagawa ............... G09C 1/00 |
| 2016/0260023 | A1 | 9/2016 | Miserendino, Jr. et al. |
| 2016/0261727 | A1 | 9/2016 | Yang et al. |
| 2016/0267132 | A1 | 9/2016 | Castellanos et al. |
| 2016/0269228 | A1 | 9/2016 | Franke et al. |
| 2016/0283551 | A1* | 9/2016 | Fokoue-Nkoutche ...................... G06F 16/182 |
| 2016/0323377 | A1 | 11/2016 | Einkauf et al. |
| 2016/0328661 | A1 | 11/2016 | Reese et al. |
| 2016/0337473 | A1 | 11/2016 | Rao |
| 2016/0350157 | A1 | 12/2016 | Necas |
| 2017/0006135 | A1 | 1/2017 | Siebel et al. |
| 2017/0032263 | A1 | 2/2017 | Yuan et al. |
| 2017/0083573 | A1 | 3/2017 | Rogers et al. |
| 2017/0109299 | A1* | 4/2017 | Belair ................. G06F 13/1668 |
| 2017/0116289 | A1* | 4/2017 | Deshmukh ........ G06F 16/24535 |
| 2017/0187785 | A1 | 6/2017 | Johnson et al. |
| 2017/0220646 | A1 | 8/2017 | Schechter et al. |
| 2017/0272458 | A1* | 9/2017 | Muddu ................. G06F 16/254 |
| 2017/0323028 | A1* | 11/2017 | Jonker ................ G06F 16/9024 |
| 2018/0054355 | A1 | 2/2018 | Balser et al. |
| 2018/0101583 | A1 | 4/2018 | Li et al. |
| 2018/0189296 | A1 | 7/2018 | Ashour et al. |
| 2018/0308585 | A1 | 10/2018 | Holmes et al. |

OTHER PUBLICATIONS

A.P. Kulkarni et al., "Survey on Hadoop and Introduction to YARN, International Journal of Emerging Technology and Advanced Engineering," May 2014, pp. 82-67, vol. 4, No. 5.

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

R.R. Miller et al., "Metagenornics for Pathogen Detection in Public Health," Genome Medicine, Sep. 20, 2013, 14 pages, vol. 5, No. 81.

T. Thomas et al., "Metagenornics—A Guide from Sampling to Data Analysis," Microbial Informatics and Experimentation, Oct. 13, 2012, 12 pages, vol. 2, No. 3.

E.R. Ganser et al., "A Technique for Drawing Directed Graphs," IEEE Transactions on Software Engineering, Mar. 1993, pp. 214-230, vol. 19, No. 3.

J. Leskovec, "Graphs Over Time: Densification Laws, Shrinking Diameters and Possible Explanations," Proceedings of the Eleventh ACM SIGKDD International Conference on Knowledge Discovery in Data Mining, Aug. 21-24, 2005, pp. 177-187.

H. Zha et al., "Bipartite Graph Partitioning arid Data Clustering," Proceedings of the Tenth International Conference on Information and Knowledge Management, Oct. 5-10, 2001, pp. 25-32.

A. Oghabian et al., "Biclustering Methods: Biological Relevance and Application in Gene Expression Analysis," Plos One, Mar. 20, 2014, 10 pages, vol. 9, No. 3.

S. Ryza, "How to: Tune Your Apache Spark Jobs," https://blog.cloudera.com/blog/2015/03/how-to-tune-your-apache-spark-jobs-part-1/, Mar. 9, 2015, 23 pages.

T. White, "Hadoop: The Definitive Guide," O'Reilly Media, Inc., Fourth Edition, Sebastopol, CA, Apr. 2015, 756 pages.

L. Shashank, "Spark on Yarn," http://www.slideshare.net/datamantra/spark-on-yarn-54201193, Oct. 21, 2015, 47 pages.

V.K. Vavilapalli et al., "Apache Hadoop Yarn: Yet Another Resource Negotiator," Proceedings of the 4th Annual Symposium on Cloud Computing (SOCC), Article No. 5, Oct. 2013, 16 pages.

A.C. Murthy et al., "Apache Hadoop Yarn: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 14/982,341 filed in the name of Patricia Gomes Soares Florissi et al., on Dec. 29, 2015 and entitled "Multi-Cluster Distributed Data Processing Platform."

U.S. Appl. No. 14/982,351 filed in the name of Patricia Gomes Soares Florissi et al., on Dec. 29, 2015 and entitled "Distributed Catalog Service for Multi-Cluster Data Processing Platform."

U.S. Appl. No. 15/395,340 filed in the name of Bryan Duerk et al., on Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., on Apr. 12, 2017 and entitled "Scalable Distributed In-Memory Computation."

U.S. Appl. No. 15/582,743 filed in the name of Patricia Gomes Soares Florissi et al., on Apr. 30, 2017 and entitled "Scalable Distributed In-Memory Computation Utilizing Batch Mode Extensions."

M. K. Gardner et al., "Parellel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.

T.R. Golub et al., "Molecular classification of Cancer: Class Discovery and Class Prediction by Gene Expression Monitoring," Science, vol. 286, Oct. 15, 1999, pp. 531-537.

D. Singh et al., "Gene Expression Correlates of Clinical Prostate Cancer Behavior," Cancer Cell, vol. 1, Mar. 2002, pp. 203-209.

U.S. Appl. No. 15/281,248 filed in the name of Patricia Gomes Soares Florissi et al., on Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

* cited by examiner

MULTI-FRAMEWORK DISTRIBUTED COMPUTATION

CROSS REFERENCE TO RELATED APPLICATIONS

The present application is a continuation-in-part of U.S. patent application Ser. No. 14/982,341, filed Dec. 29, 2015 and entitled "Multi-Cluster Distributed Data Processing Platform," now U.S. Pat. No. 10,015,106, which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety.

BACKGROUND

Computing devices may generate new data based on stored data. For example, a computing device may store a database that includes sales data for a variety of products over a period of time. The computing device may generate new data by calculating an average sale price of each sale.

In some cases, a database or other type of data source may be distributed across a number of computing devices. For example, a first portion of a database that stores sales at a first store location may be stored on a local storage of a first computing device and a second portion of the database that stores sales at a second store location may be stored on a local storage of a second computing device. To generate new data, the second portion of the database may be sent to the first computing device and stored on the local storage of the first computing device. The first computing device may, calculate the average sale price of each sale across the database using the first portion and second portion of the database stored on the local storage.

SUMMARY

In one aspect, a computing device of a data zone in accordance with one or more embodiments of the invention includes a persistent storage and a processor. The persistent storage includes a locked data batch of the data zone. The processor obtains an upstream computation request; instantiates a computation framework to process the locked data batch based on a global data batch specified in the upstream computation request; instantiates a downstream computation manager to manage a downstream computation; and instantiates, by the downstream computation manager, a second computation framework in a second computing device of a second data zone to process a second locked data batch of the second data zone.

In one aspect, a method of operating a computing device of a data zone in accordance with one or more embodiments of the invention includes obtaining, by the computing device, an upstream computation request; instantiating, by the computing device, a computation framework to process a locked data batch based on a global data batch specified in the upstream computation request, wherein the locked data batch is stored on a persistent storage of the computing device; instantiating, by the computing device, a downstream computation manager on the computing device to manage a downstream computation; and instantiating, by the downstream computation manager of the computing device, a second computation framework in a second computing device of a second data zone to process a second locked data batch of the second data zone.

In one aspect, a non-transitory computer readable medium in accordance with one or more embodiments of the invention includes computer readable program code, which when executed by a computer processor enables the computer processor to perform a method for operating a computing device of a data zone, the method includes obtaining, by the computing device, an upstream computation request; instantiating, by the computing device, a computation framework to process a locked data batch based on a global data batch specified in the upstream computation request, wherein the locked data batch is stored on a persistent storage of the computing device; instantiating, by the computing device, a downstream computation manager on the computing device to manage a downstream computation; and instantiating, by the downstream computation manager of the computing device, a second computation framework in a second computing device of a second data zone to process a second locked data batch of the second data zone.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
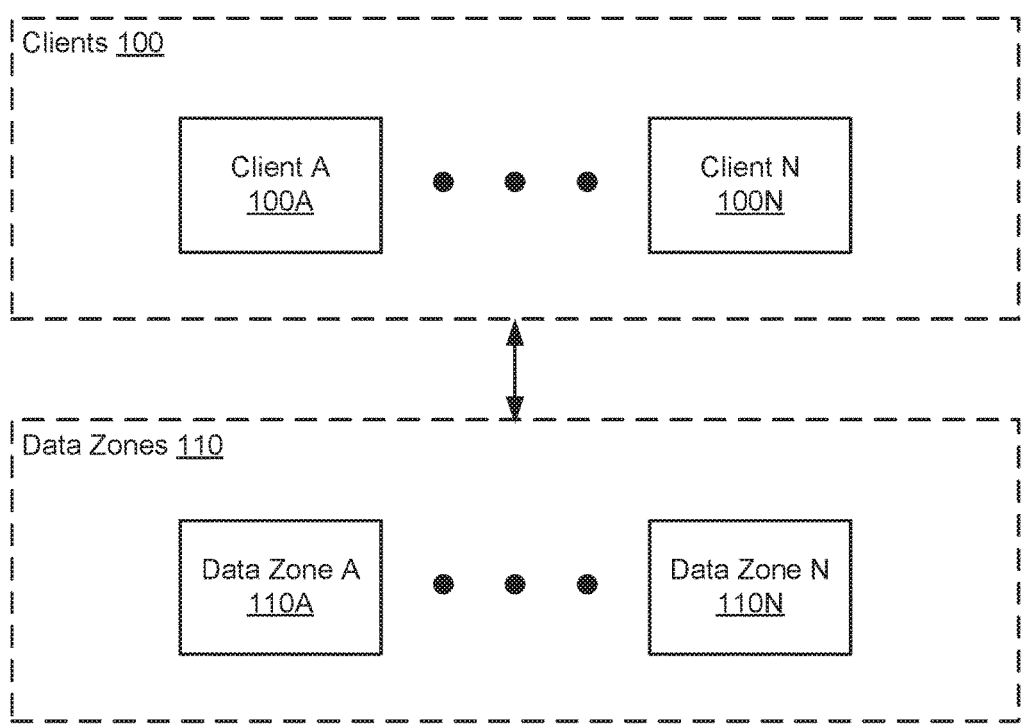
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing computations. More specifically, the systems, devices, and methods may enable computations to be performed across locked data batches distributed across any number of data zones. In one or more embodiments of the invention, the location and computation type performed in each data zone may be dynamically selected to reduce computing resource usage. Dynamically selecting the location and/or computation type performed in each data zone may enable computations to be formed without a centralized controller that orchestrates all computations across the data zones. Rather, requests sent to any data zone trigger a data zone wide computation to be performed.

As used herein, a data zone is any collection of computing and/or storage devices that are logically demarcated from all other computing devices. For example, a data zone may be a cloud computing environment. The cloud computing environment may utilize the computing resources of a number of computing devices. A system in accordance with embodiments of the invention may include multiple data zones.

As used herein, a locked data batch refers to any quantity of data in any format that is logically restricted to a corresponding data zone. For example, a cloud computing environment may host a medical record on a non-transitory storage of a computing device of the cloud computing environment. Access restrictions associated with medical records may lock the data to the cloud computing environment and prevent the medical record from being sent to a computing device of a different cloud computing environment.

In one or more embodiments of the invention, a worldwide computation may be performed by recursively instantiating computations in multiple data zones. For example, instantiating a computation in a first data zone may require, as input, a computation result from a second data zone. To obtain the computation result from the second data zone, a second computation may be instantiated in the second data zone. The second computation may use, as input, a third computation result from a third data zone. Thus, computations may be recursively instantiated across any number of data zones to service the first instantiated computation. The aforementioned process of recursively instantiating computations may enable a worldwide computation to be triggered by instantiating a single computation in a data zone. The aforementioned recursively process may be decentralized and thereby enable any number of computations to be performed. As computations are recursively instantiated, the location of instantiated computations may be dynamically selected to reduce the computing resource of performing the data zone wide computation.

FIG. 1A shows a system in accordance with one or more embodiments of the invention. The system may include clients (100) including 100A, 100N that request that computations be performed on data locked in data zones (110) including 110A, 110N. The data zones (110) may perform the requested computations and provide computation results in response to the computation requests from the clients (100). The clients (100) and data zones (110) may be operably connected. The operable connections may be implemented using any communication method or combination of methods without departing from the invention. Each component of the system is discussed below.

The clients (100) may be computing devices. The computing devices may be, for example, mobile phones, tablet computers, laptop computers, desktop computers, servers, computing clusters, or cloud computing systems. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the clients (100) described in this application. The clients (100) may be other types of computing devices without departing from the invention.

In one or more embodiments of the invention, the clients (100) may issue global computation requests to the data zones (110). A global computation request may, request that a computation result for data locked in any number of data zones (110) be provided to the requesting entity. A global computation request may specify: (i) a type of computation to be performed, (ii) the data on which the computation is to be performed, and/or (iii) an identifier of the client so that the computation result may be provided to the request issuing client. The global computation request may specify, different or additional information without departing from the invention. For additional details regarding global computation request, See FIGS. 2A-2D.

In one or more embodiments of the invention, the clients (100) may have access to a data map (not shown) that provides the clients (100) with information regarding the data stored in the data zones and/or the topology of the network of data zones. In one or more embodiments of the invention, the data map specifies: (i) the data stored in the data zones (110), (ii) the data zone of the data zones (110) in which the stored data resides, and (iii) the computing resources of the data zones (110). In one or more embodiments of the invention, the data map may be a data structure that specifies the aforementioned information. The data map may be stored on a non-transitory computer readable storage medium of any of the clients (100) or another computing device operably connected to the clients (100).

In one or more embodiments of the invention, the clients (100) utilize the data map to generate global computation requests. For example, the clients (100) may specify data stored in the data zones (110) on which to perform a calculation in the generated global computation requests using the data map.

As discuss above, the clients (100) may send global computation requests to data zones (110). The data zones (110) may collaboratively perform computations to obtain computation results requested by clients (100). In one or more embodiments of the invention, the data zones (110) may collaborate by using a uniform system for batching data and/or computation results in each data zone. The uniform system for batching may enable data/result having a similar grouping criteria to be identified. The grouping criteria may be, for example, a time stamp of the data/result. The computation results may include results of computations performed by multiple data zones that have matching grouping criteria.

In one or more embodiments of the invention each data zone may be a logical grouping of computing resources that stores data locked to the computing resources. Each of the computing resources of a data zone may be organized to complete computations specified in global computation requests from clients.

In one or more embodiments of the invention, the computing resources of the data zones (110) are computing devices. The computing devices may be, for example, mobile phones, tablet computers, laptop computers, desktop computers, servers, computing clusters, or cloud computing systems. The computing devices may include one or more processors, memory (e.g., random access memory), and persistent storage (e.g., disk drives, solid state drives, etc). The persistent storage may store computer instructions, e.g., computer code, that when executed by the processor(s) of the computing device cause the computing device to perform the functions described in this application and/or the methods illustrated in FIGS. 3-5. The computing resources of the data zones (110) may be other types of computing devices without departing from the invention.

In one or more embodiments of the invention, the computing resources of a first data zone are geographically separated from the computing resources of a second data zone. For example, a first data zone may be located in the US and the second data zone may be located in Canada.

In one or more embodiments of the invention, the computing resources of a first data zone are located adjacent to the computing resources of a second data zone. For example, the first and second data zone may include computing resources of a single computing cluster that are logically, rather than physically, separated.

In one or more embodiments of the invention, each data zone may store data that is locked to the data zone. As used herein, data that is locked to a data zone refers to data that may not be transmitted to computing resources that are not part of the logical grouping of computing resources defined by the data zone. Data may be locked to a data zone for any reason. For example, data may be locked to a data zone due to privacy concerns. In another example, data may be locked to a data zone due to the size of the data. In a further example, data may be locked to a data zone due a restriction imposed on the data by an owner of the data. The data may be locked to a data zone due to other restrictions/reasons without departing from the invention.

In one or more embodiments of the invention, the data zones (110) may be organized as a logical network. In other words, each of the data zones may be a node of the logical network. To perform computations, computation requests from clients may be distributed via the logical network. The logical network of data zones may be supported by any arrangement of operable connections.

In one or more embodiments of the invention, each data zone may include a map of the logical network of data zones. The map may specify: (i) the topology of the network, (ii) the computing resources available to each data zone, and (iii) the data stored by each data zone. The map may include more, different, and/or less information without departing from the invention.

In one or more embodiments of the invention, the data zones may send downstream computation requests to other data zones to service computation requests from clients. As used herein, a downstream computation request refers to a request generate by a data zone to service a computation request from a client. As noted above, each data zone may store locked data. A computation request from a client may require performing computations on locked data stored in different data zones. To service a client computation request, the data zones may analyze the client request and send appropriate downstream computation requests to other clients.

Figure 1B:
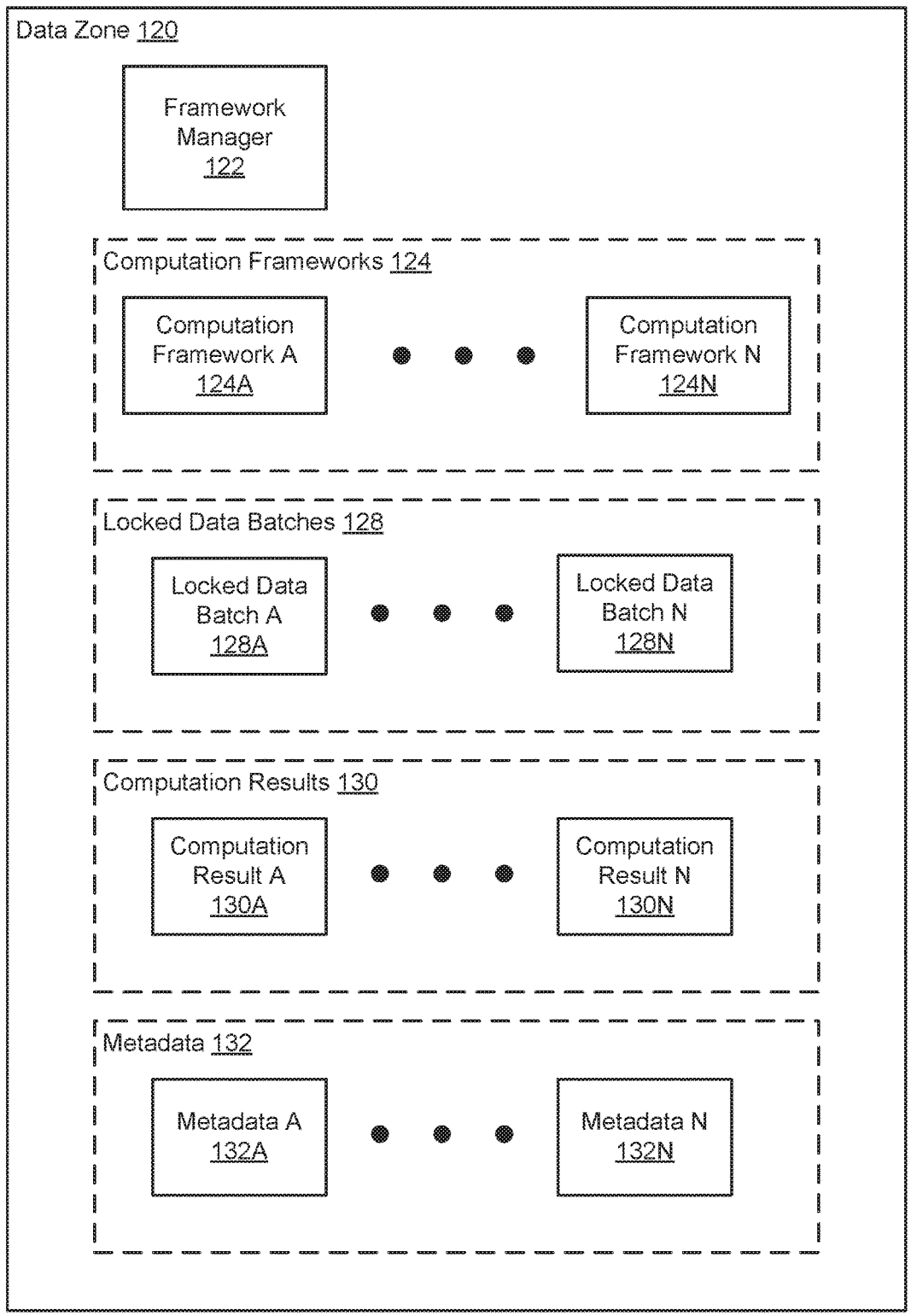
FIG. 1B shows a diagram of a data zone in accordance with one or more embodiments of the invention.

To further clarify the data zones (110), FIG. 1B shows an example of a data zone (120) in accordance with one or more embodiments of the invention. As noted above, the data zone (110) may: (i) perform computations to service client computation requests, (ii) stored locked data, and (iii) send downstream computations to service client computation requests. The data zone (120) may provide additional, different, or less functionality without departing from the invention.

Figure 4A:
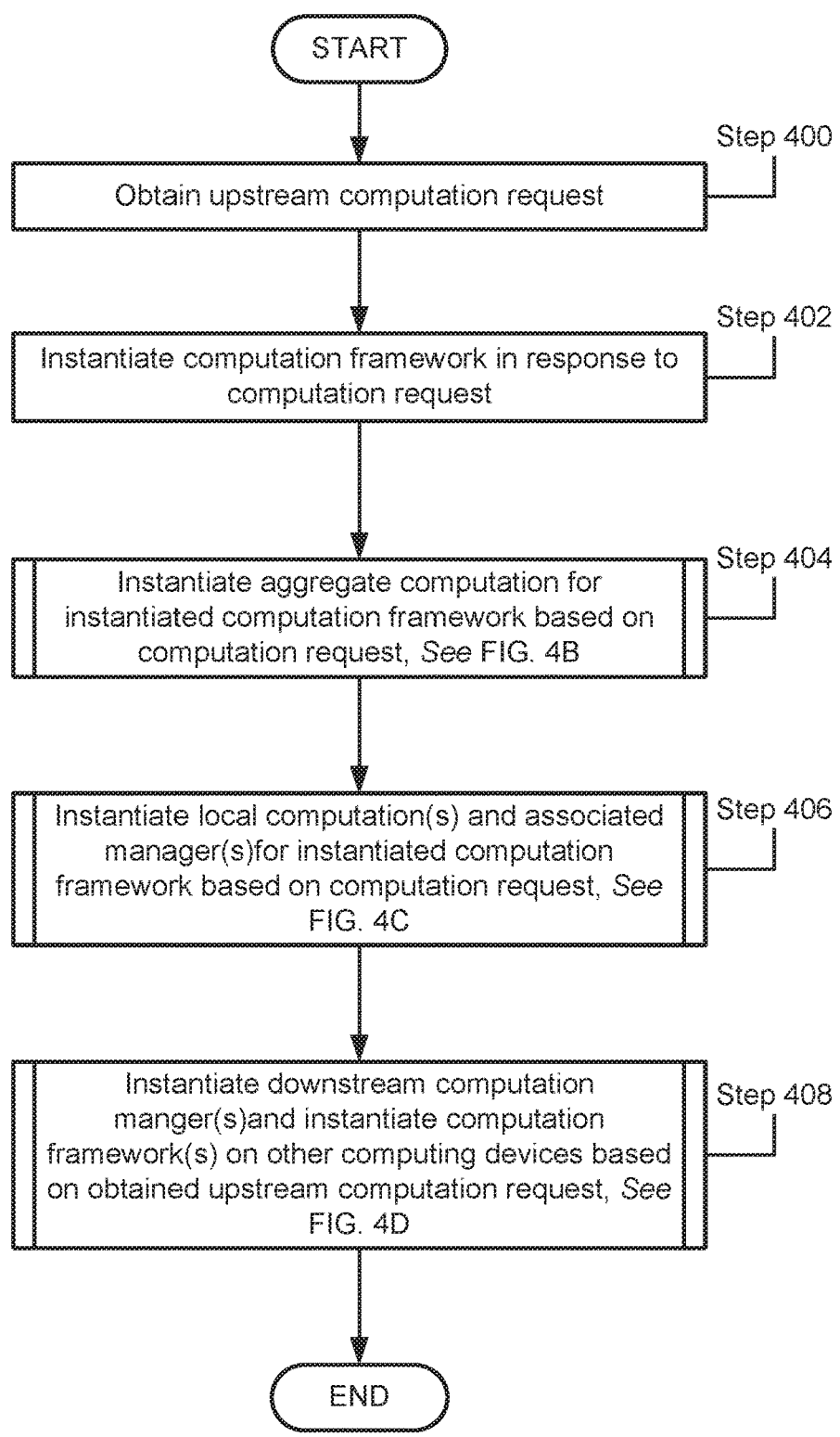
FIG. 4A shows a flowchart of a method of operating a data zone in accordance with one or more embodiments of the invention.
Figure 4B:
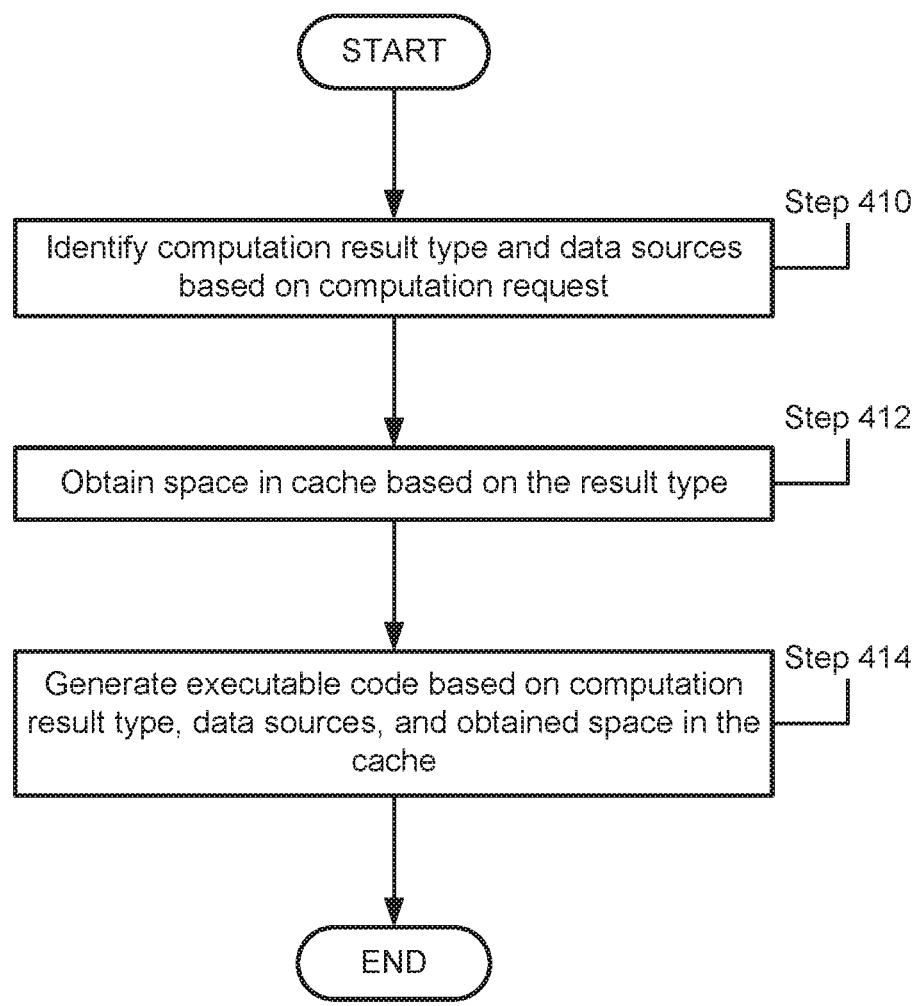
FIG. 4B shows a flowchart of a method of instantiating an aggregate computation in accordance with one or more embodiments of the invention.
Figure 4C:
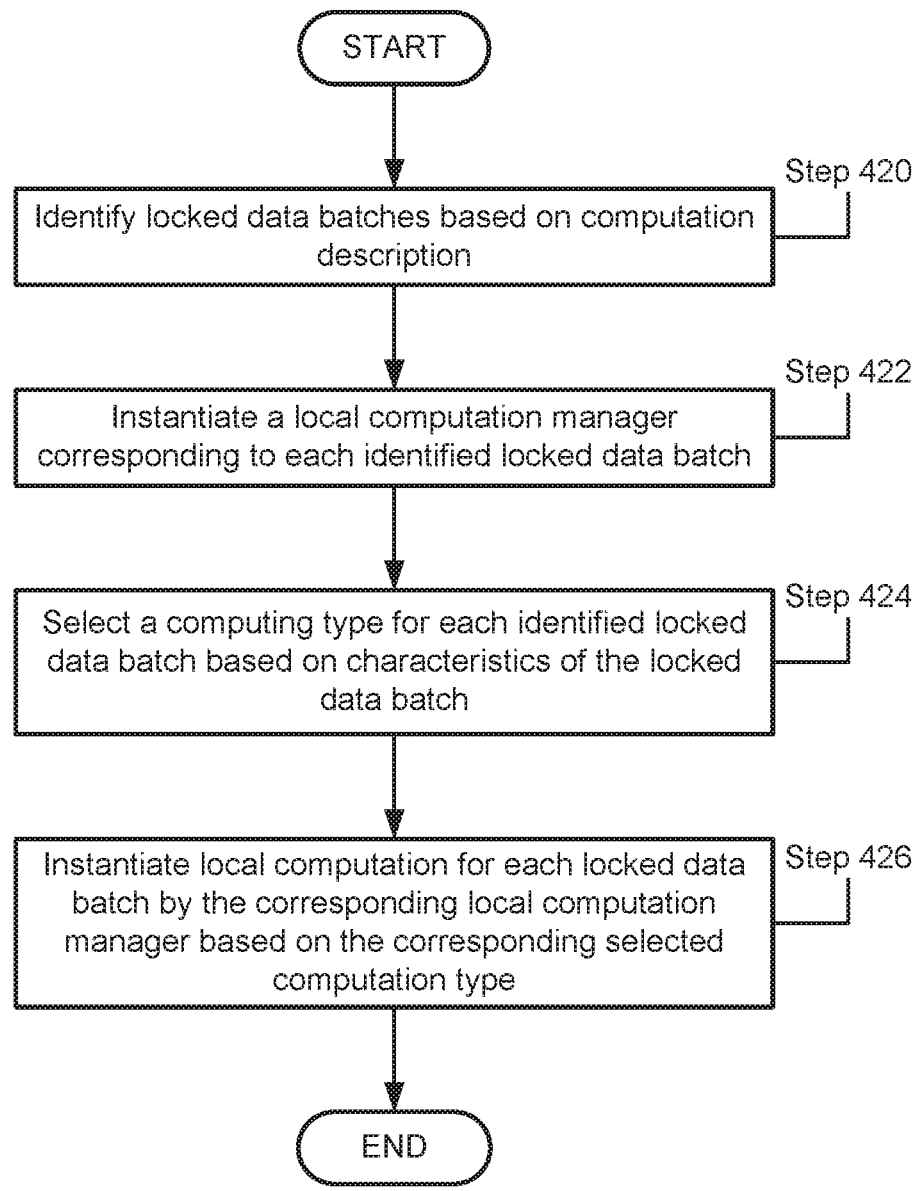
FIG. 4C shows a flowchart of a method of instantiating local computations in accordance with one or more embodiments of the invention.
Figure 4D:
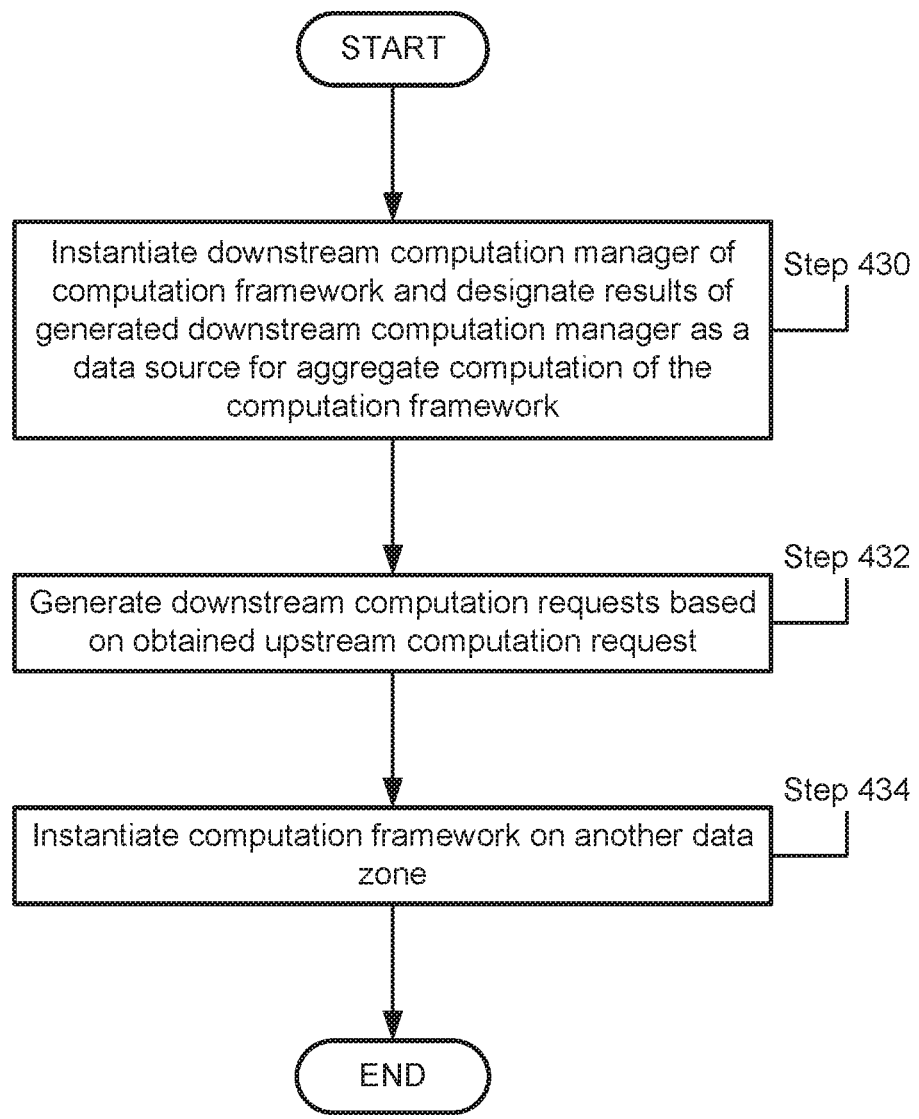
FIG. 4D shows a flowchart of a method of instantiating downstream computations in accordance with one or more embodiments of the invention.
Figure 5:
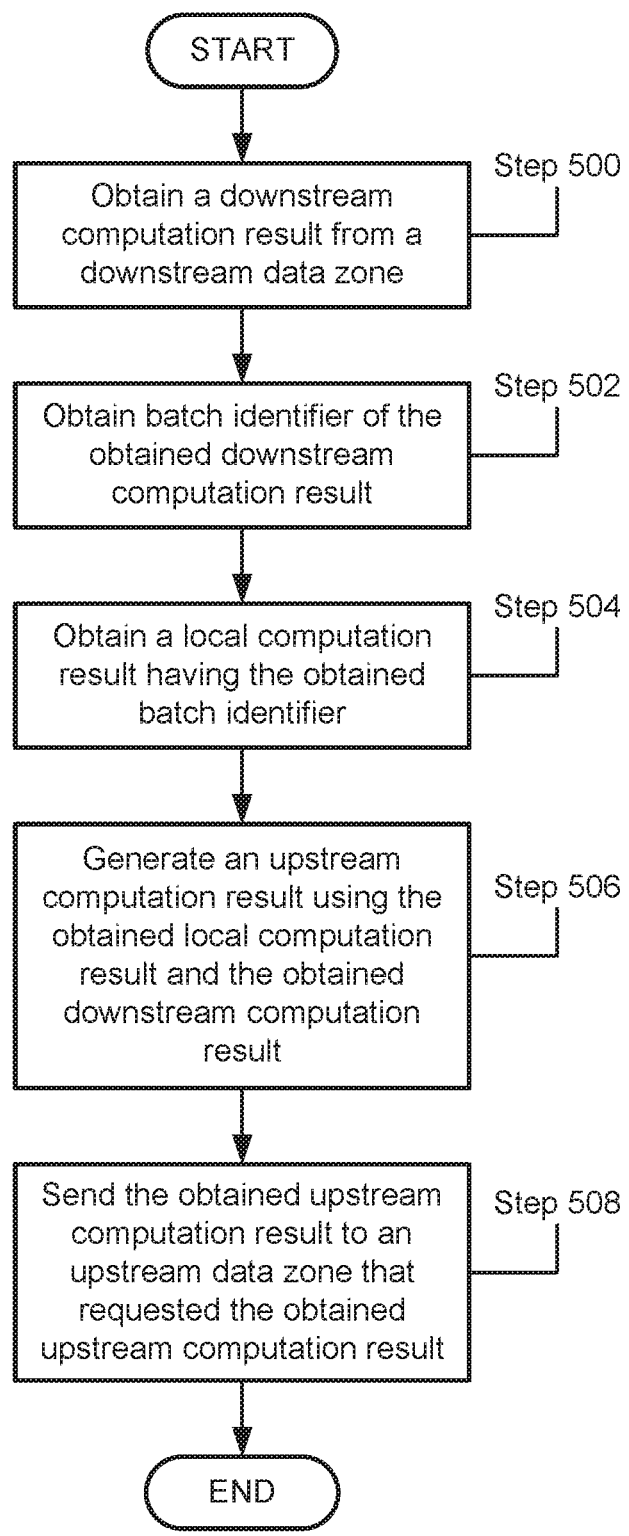
FIG. 5 shows a flowchart of a method of generating a computation result in accordance with one or more embodiments of the invention.

In one or more embodiments of the invention, the data zone (120) is a logical computing device that utilizes the physical computing resources of one or more computing devices to provide the functionality of the data zone (120) described throughout this application and/or to perform the methods illustrated in FIGS. 4A-5. The data zone (120) may be, for example, a cloud computing system. The data zone (120) may include computing resources derived from the physical computing resources of the computing devices utilized by the data zone (120).

In one or more embodiments of the invention, the data zone (120) includes computing resources that provide processing (e.g., computations provided by a processor), memory (e.g., transitory storage provided by RAM), and persistent storage (e.g., non-transitory storage provided by a hard disk drive) by utilizing the physical computing resources of the computing devices of the data zone (120). In one or more embodiments of the invention, the data zone (120) may include instructions stored on a persistent storage of a computing device of the data zone that when executed by a processor of the data zone provides the functionality of the data zone (120) described throughout this application and/or the methods illustrated in FIGS. 4A-5.

In one or more embodiments of the invention, the computing devices utilized by the data zone (120) are operably connected to each other and/or operably connected to computing devices of other data zones. For example, each of the computing devices of the data zone (120) may include a network interface that enables packets to be sent via a network to other computing devices of the data zone (120) or other data zones.

To provide the aforementioned functionality of the data zone (120), the data zone (120) may include a framework manager (122) that instantiates/manages instances of computation frameworks (124) including 124A, 124N executing using computing resources of the data zone (120), locked data batches (128) stored using computing resources of the data zone (120), computing results stored in cache(s) (130) including 130A, 130N implemented using computing resources of the data zone (120), and metadata (132) including 132A, 132N associated with the computation results (130) or locked batches (128) stored using computing resources of the data zone (120). Each component of the data zone (120) is discussed below.

In one or more embodiments of the invention, the framework manager (122) responds to upstream computation requests. The framework manager (122) may respond to the upstream computation requests by instantiating computing frameworks (124). The computation frameworks (124) may generate computation results (130) specified by the upstream computation requests.

As used herein, an upstream computation request refers to any computation request receiving from another data zone or client. In one or more embodiments of the invention, an upstream computation request is a global computation request sent from a client. In one or more embodiments of the invention, the upstream computation request is a downstream computation request generated by a computing device of another data zone. Thus, embodiments of the invention enable the recursive instantiation of any number of computations in any number of data zones. For example, receipt of an upstream computation request by a data zone may trigger a downstream computation request to be sent to service a computation instantiated in the data zone in response to the upstream computation request. In this manner, a worldwide computation may be initiated without the need for a centralized controller or other system wide orchestrating entity.

As used herein, a downstream computation request refers to a computation request generated by a data zone. The downstream computation requests may be generated by computation frameworks, as will be discussed in greater detail with respect to FIG. 1C.

As used herein, instantiating a computation framework means to start one or more processes that perform the functionality of a computation framework as will be discussed in greater details with respect to FIG. 1C. The processes may execute using computing resources of the data zone (120). In one or more embodiments of the invention, the computation frameworks (124) may be instantiated based on a template. The template may specify components and/or functionality of each computation framework.

In one or more embodiments of the invention, the framework manager (122) is implemented as one or more processes executing using computing resources of the data zone (120) based on computer instructions stored on a non-transitory computer readable media. The computing instructions, when executed using processing computing resources of the data zone (120) cause computing device(s) of the data zone (120) to perform the functions of the framework manager (122) and/or all or a portion of the methods illustrated in FIGS. 4A-4E.

In one or more embodiments of the invention, the computation frameworks (124) may service upstream computation requests. The computation frameworks (124) may service the upstream results by generating computation results (130) and/or providing generated computation results (130) to the requesting entity. In one or more embodiments of the invention, the computation results (130) may be stored in a cache of the data zone (120). For additional details regarding the computation frameworks (124), See FIG. 1C.

The locked data batches (128), computation results (130), and metadata (132) may be data stored using computing resources of the data zone (120). The data zone (120) may store additional, different types, and/or less data without departing from the invention. Each type of the aforementioned data is discussed below.

In one or more embodiments of the invention, each locked data batch of the locked data batches (128) is data stored in the data zone (120) that may not be transmitted to computing device that are not a part of the data zone (120). The data of the locked data batches (128) may be generated via any method without departing from the invention. As discussed above, the locked data batches (128) may not be transmitted to computing devices that are not a part of the data zone (120) for any reason without departing from the invention. For example, a locked data batch may, include private data that is restricted from being transmitted outside of the data zone (120). The locked data batches (128) may be used, in part, by computation frameworks (124) to generate computation results (130).

In one or more embodiments of the invention, the locked data batches (128) have varying formats. For example, a first locked data batch may be in a database format while a second locked data batch may be in a table format. Some of the locked data batches may have the same format without departing from the invention.

In one or more embodiments of the invention, the locked data batches (128) may be dynamic generated, modifies, and/or deleted. In other words, the content of each locked data batch may be changing over time. For example, a locked data batch may include data from a sensor being streamed to a computing device of the data zone.

In one or more embodiments of the invention, each locked data batch may include a batch identifier (not shown). The batch identifier may associate the locked data batch with one or more locked data batches stored in the data zone (120) and/or other data zones. The batch identifier may be, for example, a time stamp, a data source, an identifier of a data zone in which the locked batch is stored, a data format, a data type, a size of the locked batch, or another characteristic. In one or more embodiments of the invention, the batch identifier of a locked data batch may be stored as metadata (132) associated with the locked data batch.

In one or more embodiments of the invention, the computation results (130) may be results of computations performed by the computation frameworks (124). In one or more embodiments of the invention, the computation results (130) may be able to be transmitting to computing devices of other data zones, in contrast to the locked data batches (128) cannot be transmitted to computing devices of other data zones.

In one or more embodiments of the invention, each computation result may include a result identifier (not shown). The result identifier, much like a batch identifier, may associate the computation result with one or more computation results stored in the data zone (120) and/or other data zones. In one or more embodiments of the invention, the result identifier may associate the computation result with one or more locked data batches stored in the data zone (120) and/or other data zones. The result identifier may associate the computation result with any number of locked data batches and/or computation results stored in the data zone (120) and/or other data zones without departing from the invention. The result identifier may be, for example, a time stamp, a data source from which the result was generated, an identifier of a data zone in which the computation result is stored, a data format of the computation result, a data type of the computation result, a size of the computation result, or another characteristic of the computation result. In one or more embodiments of the invention, the result identifier of a computation result may be stored as metadata (132) associated with the computation result.

In one or more embodiments of the invention, the time stamp may specify the time at which the computation result was generated, the time at which the computation result was stored in a cache, of the time at which a computation that generated the computation result was instantiated.

In one or more embodiments of the invention, the metadata (132) may be data that specifies characteristics or other information associated with the locked data batches (128) and/or computation results (130). The metadata (132) may be stored in any format and/or include any type of data without departing from the invention. As will be discussed in greater details with respect to FIG. 1C, the metadata may be used by the computation frameworks (124) to select a type of aggregate computation to service upstream computation requests, select a type of local computation to service upstream computation requests, and/or to generate a downstream computation request. In one or more embodiments of the invention, the metadata may include the map used by computation frameworks to service computation requests.

As discussed above, the computation frameworks (124) may generate computation results (130) using metadata (132) and locked data batches (128). FIG. 1C shows an example of a computation framework (150) in accordance with one or more embodiments of the invention. The computation framework (150) includes a computation manager (152), an aggregate computation (154), local computation managers (156) including 156A, 156N, local computations (150), and downstream computation managers (160). Each component of the computation framework (150) is discussed below.

In one or more embodiments of the invention, the computation manager (152) instantiates: (i) aggregate computation(s) (154), (ii) local computation managers (156), and/or (iii) downstream computation managers (160). The aforementioned computations and/or managers may be instantiated by the computation manager (152) to service an upstream computation request which triggered the instantiation of the computation framework (150). Instantiating the framework (150) may include instantiating the computation manager (152).

In one or more embodiments of the invention, the computation manager (152) may instantiate an aggregate computation based on a requested computation result. As used herein, an aggregate computation is a computation that uses, as input, the results of one or more other computations. For example, two computations may be performed on two locked data batches. The results of the two computations may be used as input to the aggregate computation. The aggregate computation may be any type of computation, use any number/type/quantity of input, and produce any type/quantity of results without departing from the invention. While the aggregate computation has been described as performing a computation, embodiments of the invention are not limited to the performance of computations. The aggregate computation may perform any type of analytical function, processing function, operate on any type of data/result, and produce any type/quantity/of output without departing from the invention.

In one or more embodiments of the invention, the aggregate computation (154) may be selected from several different types of aggregate computations (154) included in a template on which the computation framework (150) is based. The type of aggregate computation (154) may be selected based on: (i) the computation result specified by the request, (ii) the location of the data zone hosting the computation framework (150) within the network of data zones, (iii) the locked data batches of the data zone hosting the computation framework (150) that are implicated by the requested computation, and (iv) the locked data batches of other data zones that are not hosting the computation framework (150) that are implicated by the requested computation. As used herein, an implicated data batch is one on which a computation must be performed to service the computation request. The computation manager (152) may instantiate aggregate computations using additional, different, or fewer factors without departing from the invention.

In one or more embodiments of the invention, the aggregate computation (154) may generate an aggregate computation result using: (i) local computation results generated by the local computations (154) and/or (ii) downstream computation results generated by local and/or aggregate computations performed by data zones in response to downstream computation requests generated by the downstream computation managers (160). In one or more embodiments of the invention, the aggregate computation result may be stored as a computation result after being generated. In one or more embodiments of the invention, the aggregate computation result may be sent to a requesting entity.

In one or more embodiments of the invention, the local computation managers (156) may be instantiated by the computation manager (152). The local computation managers (156) may instantiate local computations (158) including 158A, 158N to generate local computation results used by the aggregate computation to form an aggregate computation result.

In one or more embodiments of the invention, the local computation managers (156) may instantiate local computations (158) based on: (i) a characteristic of a locked data batch result which the local computation will use to generate a result and (ii) the availability of computing resources to perform the local computation. The local computation (158) may be instantiated based on additional, different, and/or fewer factors without departing from the invention, in one or more embodiments of the invention, instantiating a local computation may include selecting a computation type for the local computation.

As used herein, a computation type refers to a method of implementing and processing a data set. The data set may be, for example, a locked data batch. Computation types include a map/reduce computation, a split-apply-combine computation, and a partially parallel computation. The partially parallel computation may be a spark computation. The map/reduce computation may be a parallel computation.

In one or more embodiments of the invention, the characteristic of the locked data batch is a data type of the locked data batch or a data format of the locked data batch. For example, a first computation type may more efficiently generate a local computation result then a second computation type may generate a result for a format of data. In one or more embodiments of the invention, the computation type generated by the local computations (158) may be selected to minimize the computation cost of generating a local computation result among a number of different types of local computations that could be performed.

In one or more embodiments of the invention, the availability of computing resources to perform the local computation is determined by querying a scheduler that performs a schedule of a type of computation to identify when the aforementioned computation may be performed/completed. For example, a data zone may include a scheduler/allocator used to schedule the performance of local computations (158). Different types of computations may have different scheduling availabilities. For example, a first type of computation may be able to be scheduled for execution before a second type of computation is available to be schedule for execution. In one or more embodiments of the invention, the local computations managers (156) may select a computation type that will be instantiated based on the aforementioned scheduling availability.

As noted above, in one or more embodiments of the invention, the local computations (158) may generate computation results using locked data batches. The local computations (158) may generate computation results continuously, periodically, at predetermined point in time, or may be triggered. In one or more embodiments of the invention, the local computations may generate computation results continuously, by generating computation results in response to changes in a locked data batch used by the local computation to generate the result.

In one or more embodiments of the invention, the downstream computation managers (160) may instantiate computation frameworks in other data zones. In one or more embodiments of the invention, the frameworks in other data zones may be instantiated based on: (i) a characteristic of a locked data batch stored in the other data zones and (ii) the location within the network of data zones of the other data zones. The location, i.e., data zone in which the framework is instantiated, may be selected to minimize computing resources used to generate a computation result and/or a time window in which the computation result is to be generated.

In one or more embodiments of the invention, the computation manager (152), aggregate computation (154), local computation managers (156), local computations (158), and downstream computation managers (160) are implemented as computer instructions, e.g., computer code, stored on a non-transitory storage that is executed using processing resources of the data zone (120, FIG. 1B). The computer instructions associated with each of the aforementioned computations and managers when executed by the processing resources of the data zone (120, FIG. 1B) may generate one or more processes executing on the data zone (120, FIG. 1B) that provide the functionality of each of the aforementioned computations and managers. In other embodiments of the invention, aforementioned computations and managers may be implemented as hardware devices such as, for example, programmable gate arrays, application specific integrated circuits, or other electronic devices including circuitry that provide the aforementioned functionality.

Figure 2A:
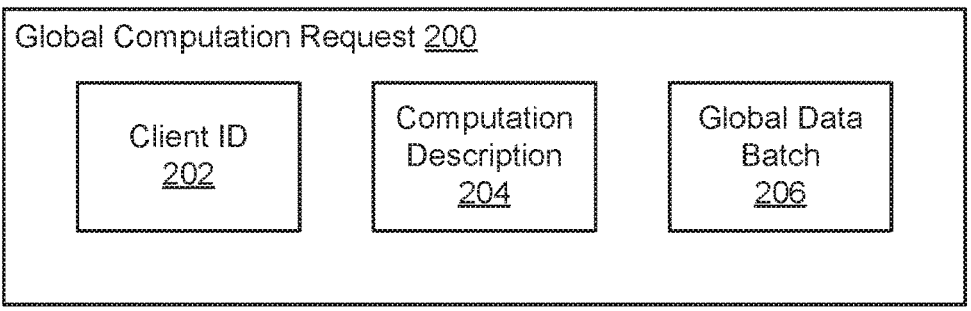
FIG. 2A shows a diagram of a global computation request in accordance with one or more embodiments of the invention.
Figure 2B:
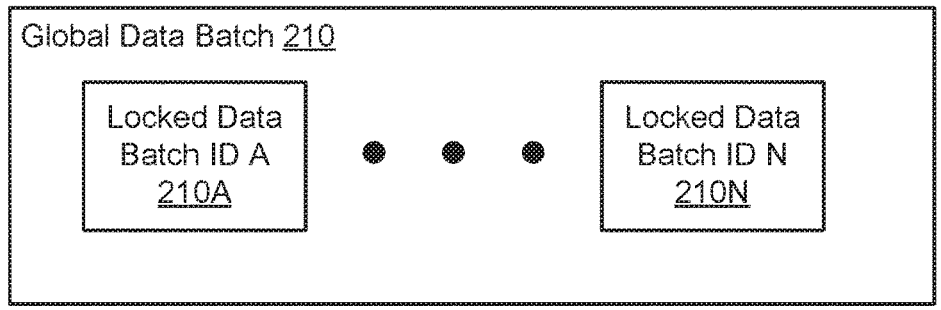
FIG. 2B shows a diagram of a first example global data batch in accordance with one or more embodiments of the invention.
Figure 2C:
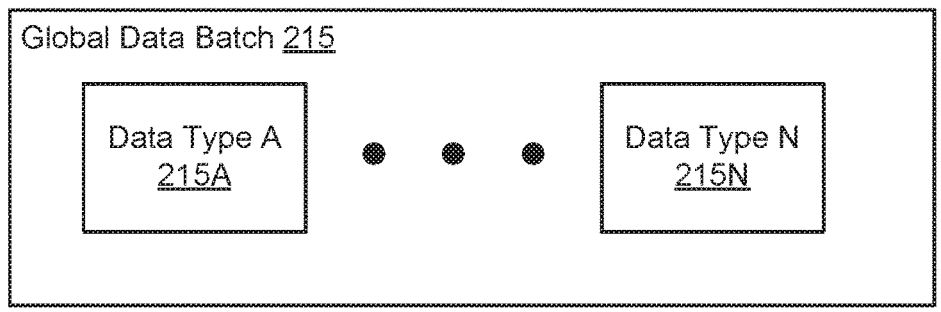
FIG. 2C shows a diagram of a second example global data batch in accordance with one or more embodiments of the invention.
Figure 2D:
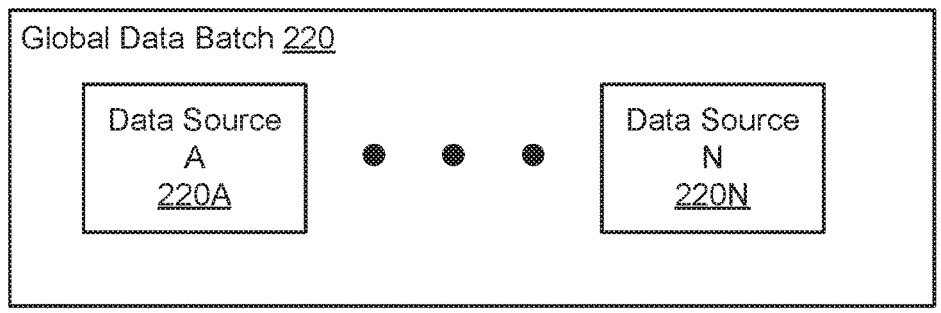
FIG. 2D shows a diagram of a third example global data batch in accordance with one or more embodiments of the invention.
Figure 2E:
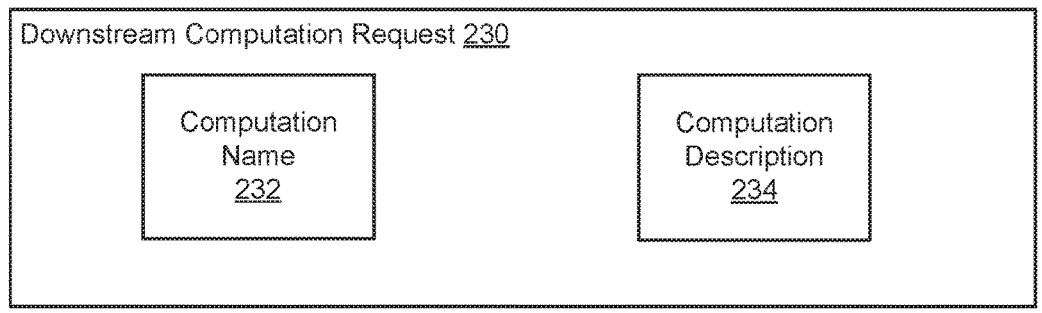
FIG. 2E shows a diagram of a first example downstream computation request in accordance with one or more embodiments of the invention.
Figure 2F:
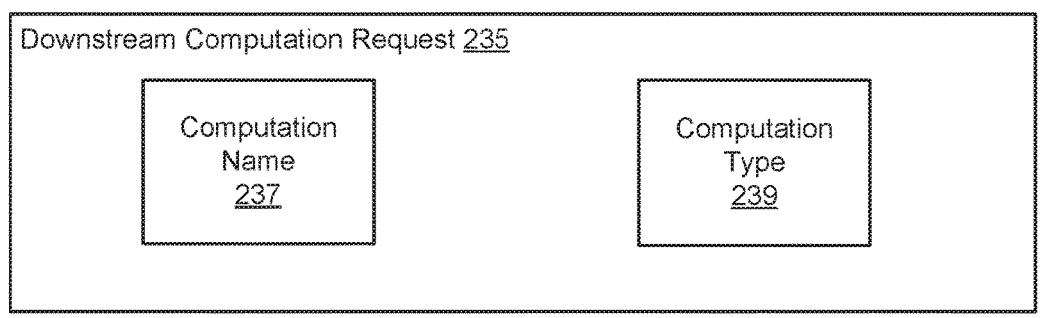
FIG. 2F shows a diagram of a second example downstream computation request in accordance with one or more embodiments of the invention.
Figure 2G:
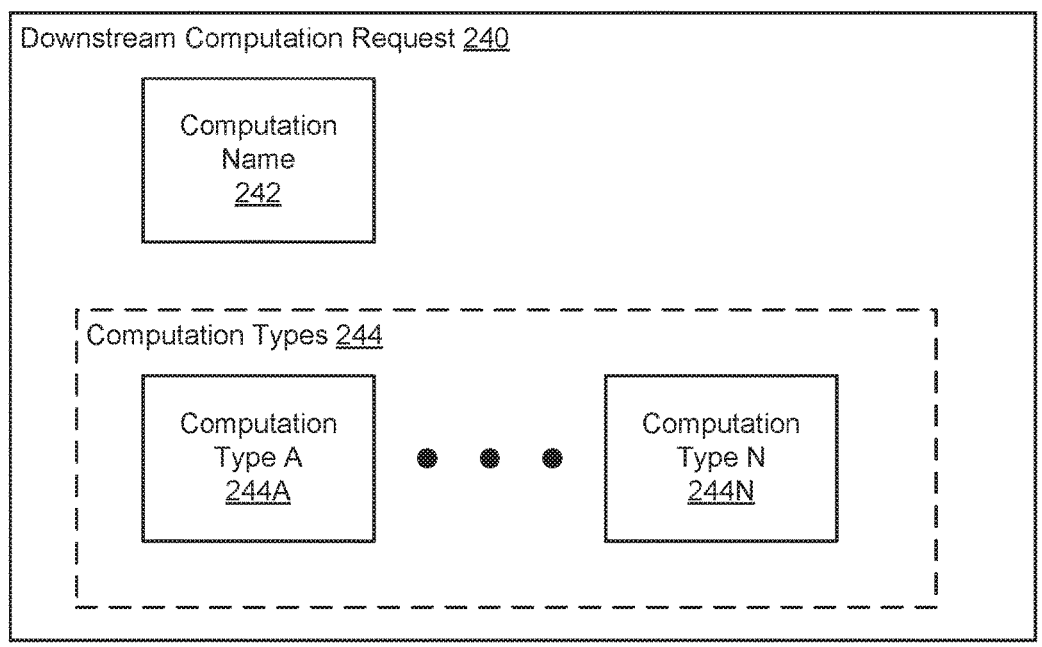
FIG. 2G shows a diagram of a third example downstream computation request in accordance with one or more embodiments of the invention.
Figure 2H:
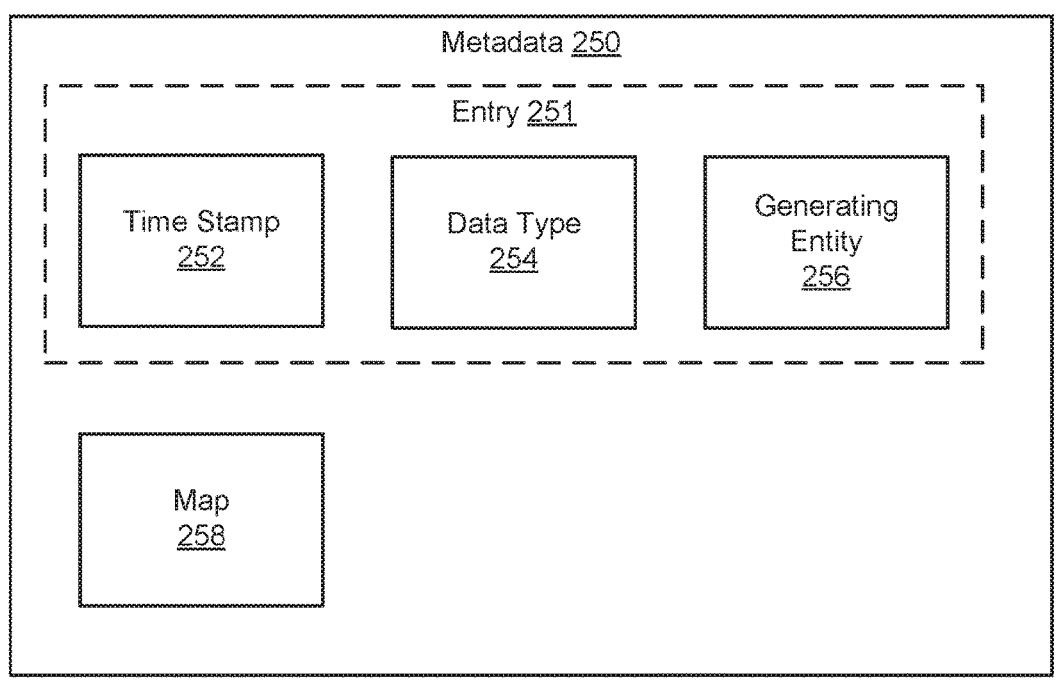
FIG. 2H shows a diagram of an example of metadata in accordance with one or more embodiments of the invention.

To further clarify aspect of the invention, FIGS. 2A-2H shows data structures utilized by clients (100, FIG. 1A) and data zones (110, FIG. 1A) in accordance with one or more embodiments of the invention. For specifically, FIGS. 2A-2D show examples of data structures utilized by clients to communicate computation requests to data zones. More specifically, clients may send a global computation request to a data zone to initiate a computation. An example of a global computation is shown in FIG. 2A and includes a global data batch (206). The global data batch (206) may specify the data on which the global computation is to be performed. The global data batch (206) may specify the data on which the global computation is to be performed using a multitude of different criteria without departing from the invention. FIGS. 2B-2D show examples of global data batches that specify different criteria used to identify the data on which a global computation is to be performed. For example, FIG. 2B shows a global data batch that includes the criteria of identifiers of locked data batches. In contrast, FIG. 2C shows a global data batch that includes the criteria of data types. Thus, a global data batch like that shown in FIG. 2B may specify specific locked data batches on which a global computation operates while a global data batch like that shown in FIG. 2C may specify all data batches that include data of one or more types specified by the global data batch. Additionally, FIGS. 2E-2G show examples of data structures used by data zones to communicate computation requests to other data zones. In contrast, FIG. 2H shows an example structure of a metadata used by clients and/or data zones when generating computation requests, in addition to other functions of the clients and/or data zones.

FIG. 2A shows an example of a global computation request (200) in accordance with one or more embodiments of the invention. The global computation request (200) may be sent by a client to a data zone to initiate a computation or by a data zone to another data zone as a downstream request. The global computation request (200) may include a client identifier (202), a computation description (204), and a global data batch (206). Each component of the example global computation request (200) is discussed below.

The client identifier (202) may be an identifier of the client to which a result of the computation specified by the global computation request (200) is to be returned. In one or more embodiments of the invention, the client identifier (202) is an identifier of the client that generated the global computation request (200). In one or more embodiments of the invention, the client identifier (202) is a media access control address of the client that generated the global computation request (200). The client identifier (202) may be a media access control address of a client that did not generate the global computation request (200) without departing from the invention.

The computation description (204) may be a description of the computation result desired by the requesting entity. For example, the computation description (204) may indicate that an average of a number of values stored in various data zones is being requested by the requesting entity. The computation description (204) may indicate any type of computation without departing from the invention.

The global data batch (206) may indicate data stored in the data zones on which a computation specified by the computation description (204) is to be performed. The global data batch (206) may indicate the stored data at varying levels of granularity and/or in different formats without departing from the invention. FIGS. 2B-2C shows examples of global data batches specified at varying levels of granularity and in different formats.

FIG. 2B shows a first example of a global data batch (210) in accordance with one or more embodiments of the invention. The global data batch (210) includes identifiers (210A, 210N) of locked data batches stored in data zones. While not illustrated, the global data batch (210) may indicate a subset of the data of each locked data batch to be used to generate a computation result without departing from the invention.

FIG. 2C shows a second example of a global data batch (215) in accordance with one or more embodiments of the invention. The second example global data batch (212)

includes data types (215A, 215N) on which the computation is to be performed. The data type of each locked data batch may be specified by corresponding metadata and thereby enable all of the locked data batches that match the types of data specified by the second example global data batch (215) to be identified.

FIG. 2D shows a third example of a global data batch (220) in accordance with one or more embodiments of the invention. The third example global data batch (212) includes data sources (220A, 220N) on which the computation is to be performed. The data sources may be, for example, data zones.

While FIGS. 2B-2D shows examples of global data batches, the data on which computations are to be performed may be specified using different types of data structures, at different levels of granularity, and/or specify different matching criteria without departing from the invention. For example, any type of metadata of each locked data batch may be used as a basis for specifying the locked data batches on which a computation is to be performed.

FIGS. 2E-2G show examples of downstream computation requests in accordance with embodiments of the invention. The downstream computation requests shown in FIGS. 2E-2G may be sent by downstream computation managers to other data zones.

FIG. 2E shows a first example downstream computation request (230) in accordance with one or more embodiments of the invention. The first example downstream computation request (230) includes a computation name (232) and a computation description (234). The computation may be an identifier of the computation. The identifier may be used by a downstream computation manager and a computation framework instantiated in a data zone by the downstream computation to send computation results of the computation framework to the downstream computation manager. Thus, the computation result of a downstream computation may be passed to a computation framework in another data zone. The other data zone may then use the computation result passed to generate an additional computation result. The computation description (234) may be similar to the computation description (204, FIG. 2A) of the global computation request.

FIG. 2F shows a second example: downstream computation request (235) accordance with one or more embodiments of the invention. The second example downstream computation request (235) includes a computation name (237), identical to the computation name (232) of the first example downstream computation request (230), and a computation type (239). The computation type (239) may specify a type of computation to be performed in response to receiving the downstream computation request (235).

FIG. 2G shows a third example downstream computation request (240) in accordance with one or more embodiments of the invention. The third example downstream computation request (240) includes a computation name (242), identical to the computation name (232) of the first example downstream computation request (230), and computation types (244). The computation type(s) (244) may specify a number of different computation types (244A, 244N) with an expectation that one of the specified computation types may be performed in response to receiving the downstream computation request (235).

As discussed above, metadata may be used by clients and/or data zones to generate global/downstream computation requests. Metadata may include any type of data associated with stored data, e.g., locked data batches/computation results, or data that describes a topology of the network, e.g., topology of the computing devices of data zone(s), computing resources of data zone(s), topology of the network including clients and/or data zones.

FIG. 2H shows an example of metadata (250) in accordance with one or more embodiments of the invention. The metadata (250) includes an entry (251) that includes data associated with a locked data batch. The entry (252) includes a time stamp (252), a data type (254), and a generating entity (256) of the locked data batch associated with the entry (251). The entry (251) may include additional, different, or less data regarding the associated locked data batch without departing from the invention. Additionally, the metadata (250) may include any number of entries associated with any number of locked data batches and/or computation results without departing from the invention.

The metadata (250) also includes a map (258). In one or more embodiments of the invention, the map (258) indicates the topology of the network of clients/data zones, or a portion thereof. In one or more embodiments of the invention, the topology of the network indicates the computing resources of the clients/data zones, or a portion thereof. In one or more embodiments of the invention, the topology of the network indicates the locked data batches of the data zones, or a portion thereof. The map (258) may include additional, different, or less information without departing from the invention.

Figure 3:
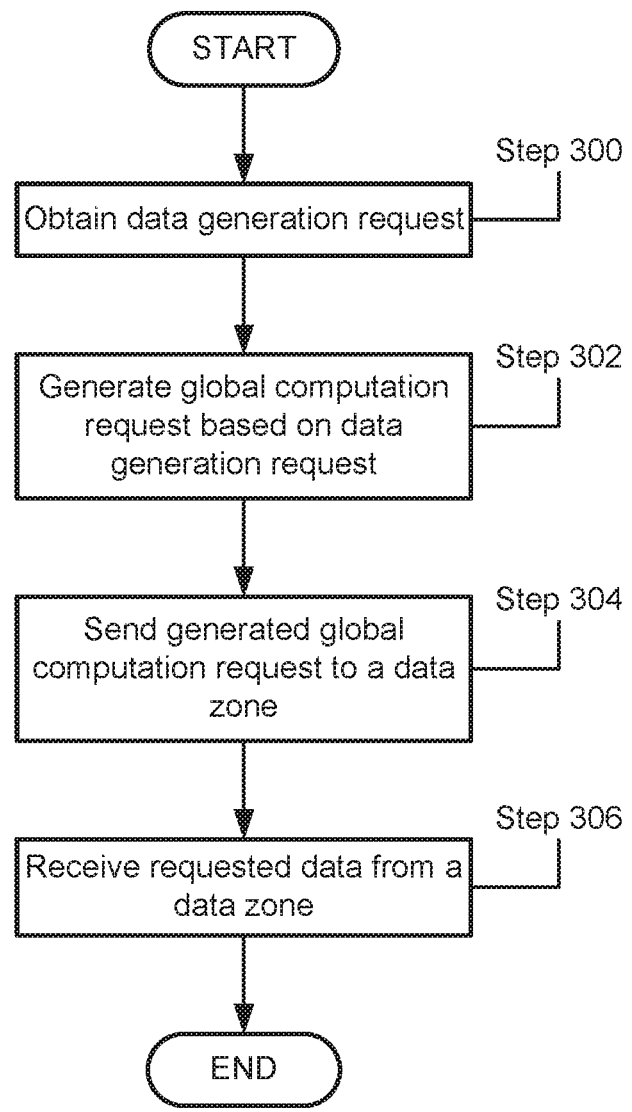
FIG. 3 shows a flowchart of a method of obtaining data from a data zone in accordance with one or more embodiments of the invention.

As discussed above, the data zones (110, FIG. 1A) may perform computations in response to requests from the clients (100, FIG. 1A) or other data zones. FIGS. 3-5 show methods in accordance with one or more embodiments of the invention to initiate computations or perform computations.

While illustrated as separate methods, each of the methods illustrated in FIGS. 3-5 may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 3 shows a flowchart of a method in accordance with one or more embodiments of the invention. The method depicted in FIG. 3 may be used to initiate a computation in accordance with one or more embodiments of the invention. The method shown in FIG. 3 may be performed by, for example, a client (100, FIG. 1A). Other component of the system illustrated in FIG. 1A may perform the method of FIG. 3 without departing from the invention.

In Step 300, a data generation request is obtained.

In one or more embodiments of the invention, the data generation request may be obtained from an application executing on the client. In one or more embodiments of the invention, the data generation request is obtained from a second client. In one or more embodiments of the invention, the data generation request is obtained from a data zone.

In Step 302, a global computation request is generated based on the obtained data generation request.

In one or more embodiments of the invention, the generated global computation request specifies the requesting entity, a computation to be performed, and the data on which the computation is to be performed.

In Step 304, the generated global computation request is sent to a data zone.

In Step 306, the requested data is obtained from a data zone. The data zone of Step 306 may be the same or different from the data zone in Step 304.

The method may end following Step 306.

FIG. 4A shows a flowchart of a method in accordance with one or more embodiments of the invention. The method depicted in FIG. 4A may be used to perform a computation in accordance with one or more embodiments of the invention. The method shown in FIG. 4A may be performed by, for example, a data zone (110, FIG. 1A). Other component of the system illustrated in FIG. 1A may perform the method of FIG. 4A without departing from the invention.

In Step 400, an upstream computation request is obtained.

In one or more embodiments of the invention, the upstream computation request is a global computation request obtained from a client.

In one or more embodiments of the invention, the upstream computation request is a downstream computation request obtained from another data zone.

As discussed above, in one or more embodiments of the invention, the system of FIG. 1A may perform computations by dynamically selecting data zones and/or computations to be performed by the data zones as a computation request propagates through the data zones. The designation as an upstream or downstream request designates requests as being received or sent, respectively, by a particular data zone.

In Step 402, a computation framework is instantiated in response to obtaining the upstream computation request.

Figure 1C:
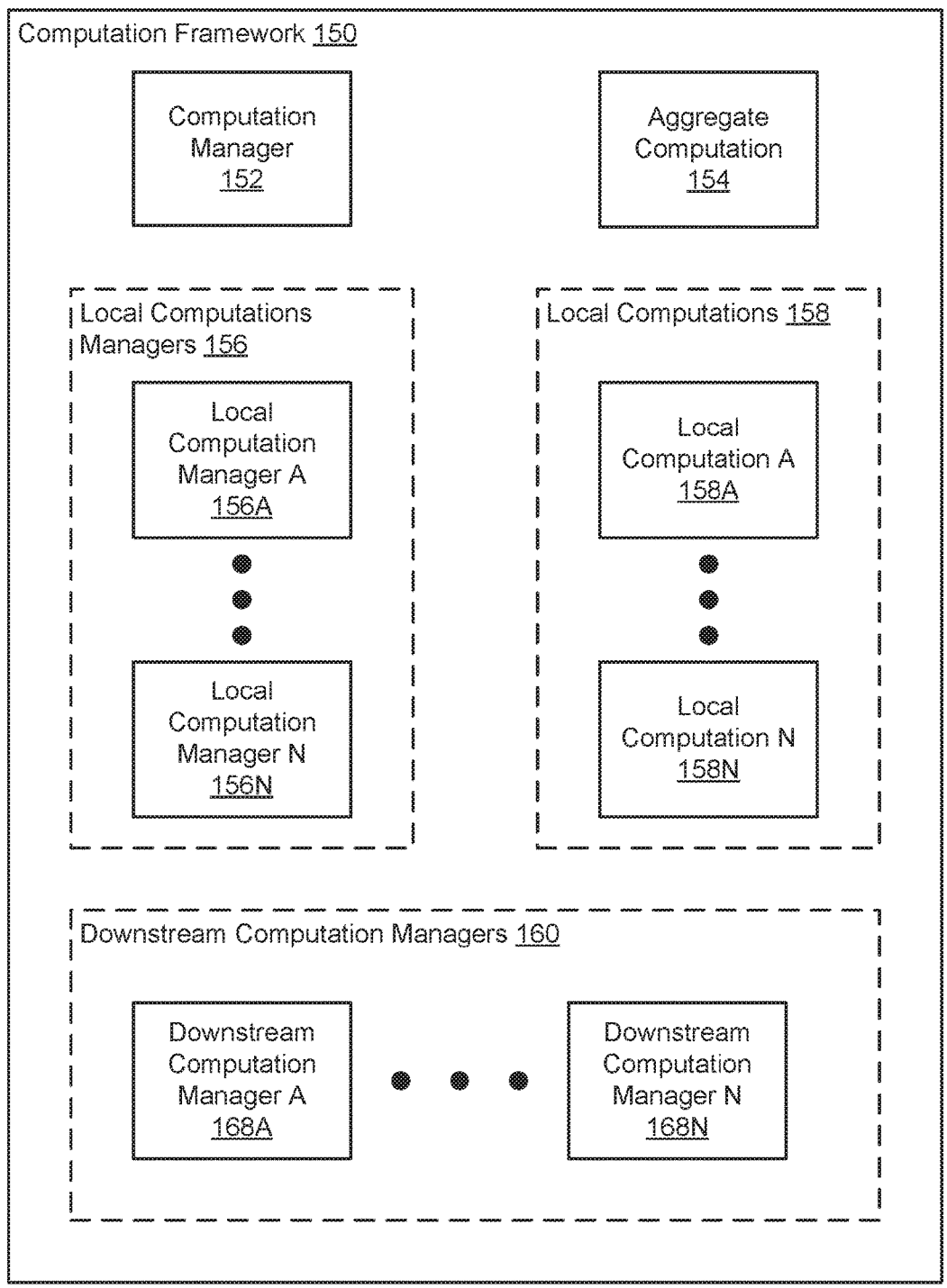
FIG. 1C shows a diagram of a computation framework in accordance with one or more embodiments of the invention.

In one or more embodiments of the invention, instantiating the computation framework includes generating a computation manager (e.g., 152, FIG. 1C).

In Step 404, an aggregate computation of the instantiated computation framework is instantiated based on the obtained upstream computation request.

In one or more embodiments of the invention, the aggregate computation is instantiated by the computation manager. To instantiate the aggregate computation, the computation manager may identify a computation type specified by the obtained upstream computation request and instantiate the aggregate computation based on the identified computation type.

In one or more embodiments of the invention, the aggregate computation may be instantiated using the method illustrated in FIG. 4B. The aggregate computation may be instantiated using other methods without departing from the invention.

In Step 406, local computation managers and local computations are instantiated based on the obtained upstream computation request.

In one or more embodiments of the invention, the computation manager may instantiate the local computation managers. In turn, each of the local computation managers may instantiate a corresponding local computation.

In one or more embodiments of the invention, the local computation managers instantiate corresponding local computations based on a data type or data format of the data on which the respectively local computation will operate. In one or more embodiments of the invention, the type of local computation is selected to minimize the computing resource cost of performing the local computation. In one or more embodiments of the invention, the type of local computation is selected to improve the efficiency of performing the local computation.

In one or more embodiments of the invention, the local computation managers instantiate corresponding local computations based on an availability of computing resources to perform different types of local computations. In one or more embodiments of the invention, the type of local computation is selected to meeting a scheduling requirement of the result to be generated by the local computation.

In one or more embodiments of the invention, the local computation managers and local computations may be instantiated using the method illustrated in FIG. 4C. The local computation managers and local computations may be instantiated using other methods or make decisions based on other criteria without departing from the invention.

In Step 408, downstream computation managers are instantiated and computation framework(s) on other data zones are instantiated based on the obtained upstream computation request.

In one or more embodiments of the invention, the computation manager may instantiate the downstream computation managers. As noted above, the computation manager may instantiate the aggregate computation and thereby be aware of the data on which the aggregate computation operates. To provide some of the data, the computation manager may instantiate downstream computation managers to obtain computation results from other data zones to use as input to the aggregate computation.

In one or more embodiments of the invention, the downstream computation managers may instantiate corresponding computation frameworks on other data zones to obtain data needed by its aggregate computation to generate a computation result.

In one or more embodiments of the invention, the downstream computation managers and computing frameworks on other data zones may be instantiated using the method illustrated in FIG. 4D. The downstream computation managers and computing frameworks may be instantiated using other methods without departing from the invention.

The method may end following Step 408.

Thus, as illustrated in FIG. 4A, the reception of an upstream computation request may result in the instantiation of computation frameworks in other data zones. In this manner, computations may be recursively generated in any number of data zones to service upstream computations. Accordingly, the instantiation of a single computation may give rise to a worldwide computation facilitated by the recursive instantiation of computations to service the single computation.

FIG. 4B shows a flowchart of a method in accordance with one or more embodiments of the invention. The method depicted in FIG. 4B may be used to instantiate an aggregate computation in accordance with one or more embodiments of the invention. The method shown in FIG. 4B may be performed by, for example, a data zone (110, FIG. 1A). Other component of the system illustrated in FIG. TA may perform the method of FIG. 4B without departing from the invention.

In Step 410, a computation result type and data sources are identified based on the obtained upstream computation request.

In one or more embodiments of the invention, the computation result type and/or data sources may be specified in the obtained upstream computation request. For example, the upstream computation request may be a global computation request or a downstream computation request.

In Step 412, space in a cache may be obtained to store the results generated by the aggregate computation.

In Step 414, executable code may be generated based on the identified computation result type, the identified data sources, and the obtained space in the cache. In one or more embodiments of the invention, the executable code may be computing instructions stored on a persistent storage of the data zone.

In one or more embodiments of the invention, a template may be selected based on the identified computation result type. The template may include prototype executable code and place holders for input and output. The prototype executable may be modified to replace the place holders with the identified data sources and space obtained in the cache as the input and output, respectively.

In one or more embodiments of the invention, the generated executable code is executed by processing resources of the data zone after the executable code is generated and stored on a persistent storage of the data zone.

The method may end following Step 414.

FIG. 4C shows a flowchart of a method in accordance with one or more embodiments of the invention. The method depicted in FIG. 4C may, be used to instantiate local computation managers and local computations in accordance with one or more embodiments of the invention. The method shown in FIG. 4C may be performed by, for example, a data zone (110, FIG. 1A). Other component of the system illustrated in FIG. 1A may perform the method of FIG. 4C without departing from the invention.

In Step 420, locked data batches are identified based on a computation description.

In one or more embodiments of the invention, the computation description is obtained from the obtained upstream computation request. For example, the upstream computation request may be a global computation request or a downstream computation request.

In Step 422, a local computation manager is instantiated corresponding to each identified locked data batch.

In Step 424, a computation type is selected for each local computation manager based on the characteristics of the locked data batch associated with each local computation manager.

In one or more embodiments of the invention, the characteristics of the locked data batch are a type of the data and a format of the data. In one or more embodiments of the invention, the computation type for each local computation manager is one of a map/reduce computation, a split-apply-combine computation, and a partially parallel computation. The computation type may be other computation types without departing from the invention.

In one or more embodiments of the invention, the computation type for each local computation manager may also be selected based on a computing resource availability for each computation type. For example, some computation types may not be available to be performed within a predetermined time set by a request even though the aforementioned computation may require fewer computing resources than other types of computations. In one or more embodiments of the invention, a less computing resource efficient computation type is selected when a more efficient computation type cannot be performed with the predetermined time.

In Step 426, the local computations are instantiated for each locked data batch by the corresponding local computation manager based on the corresponding selected computation type for the corresponding local computation manager.

In one or more embodiments of the invention, instantiating the local computation includes scheduling execution of the local computations and executing the local computations after scheduling.

In one or more embodiments of the invention, each local computation may be generated using a template corresponding to the selected computation type. The template may include prototype executable code and place holders for input and output. The prototype executable may be modified to replace the place holders with an identifier of the corresponding locked data batch on which the computation will be performed and an identifier of storage space for storing the result of the local computation.

In one or more embodiments of the invention, the generated executable code is executed by processing resources of the data zone after the executable code is generated and stored on a persistent storage of the data zone.

The method may end following Step 426.

FIG. 4D shows a flowchart of a method in accordance with one or more embodiments of the invention. The method depicted in FIG. 4D may be used to instantiate downstream computation managers and computation frameworks on other data zones in accordance with one or more embodiments of the invention. The method shown in FIG. 4D may be performed by, for example, a data zone (110, FIG. 1A). Other component of the system illustrated in FIG. 1A may perform the method of FIG. 4D without departing from the invention.

In Step 430, a downstream computation manager of a computation framework is instantiated and the computation result of a computation framework to be generated on another data zone is designated as a data source for the aggregate computation of the computation framework.

In one or more embodiments of the invention, the downstream computation manager is instantiated by a computation manager of the framework. As discussed above, the computation framework may instantiate an aggregate computation and thereby is aware of data required by the instantiated aggregate computation to generate a computation result. The computation manager of the framework may provide the downstream computation manager with a type of the computation to be performed and a data source on which the computation is to be performed.

In one or more embodiments of the invention, designating the computation result of the to be generated computation framework on another data zone as a data source includes notifying the instantiated downstream computation manager that the computation result is to be provided to the aggregate computation.

In Step 432, a downstream computation request is generated based on the obtained upstream computation request.

In one or more embodiments of the invention, the downstream computation request may be similar to that shown in FIGS. 2E-2G. The upstream computation request may be processed by the computation manager of the computation framework and provide the necessary information to the downstream computation manager to generate the request.

In one or more embodiments of the invention, the downstream computation manager may select a data zone in which to instantiate a computation framework. In one or more embodiments of the invention, the selection is made using a map. In one or more embodiments of the invention, the selection is made to minimize a computing resource cost of performing a computation. In one or more embodiments of the invention, the selection is made to minimize a network bandwidth cost of performing the computation. In one or more embodiments of the invention, the selection is made based on a computing resource availability of the data zones. The selection may be made based on additional, different, or fewer factors without departing from the invention.

In Step 434, the computation framework of Step 430 is instantiated on another data zone determined in Step 432.

In one or more embodiments of the invention, the computation framework may be instantiated by sending the generated downstream computation request to another data zone. The other data zone may instantiate the computation framework in response to the request.

The method may end following Step 434.

FIG. 5 shows a flowchart of a method in accordance with one or more embodiments of the invention. The method depicted in FIG. 5 may be used to perform an aggregate computation in accordance with one or more embodiments of the invention. The method shown in FIG. 5 may be performed by, for example, a data zone (110, FIG. 1A). Other component of the system illustrated in FIG. 1A may perform the method of FIG. 5 without departing from the invention.

In Step 500, a downstream computation result is obtained from a downstream data zone.

In one or more embodiments of the invention, a downstream data zone is a data zone in which a downstream computation was instantiated by the data zone performing the method illustrated in FIG. 5.

In Step 502, a batch identifier of the obtained downstream computation result is obtained. The batch identifier may be obtained from the metadata associated with the downstream computation result.

In Step 504, a local computation result having the obtained batch identifier is obtained.

In Step 506, an upstream computation result is generated using the obtained local computation result and the obtained downstream computation result.

In one or more embodiments of the invention, the upstream computation result is generated as the output of an aggregate computation of a computing framework.

In Step 508, the obtained upstream computation result is sent to an upstream data zone that requested the obtained upstream computation result.

The method may end following Step 508.

Figure 6:
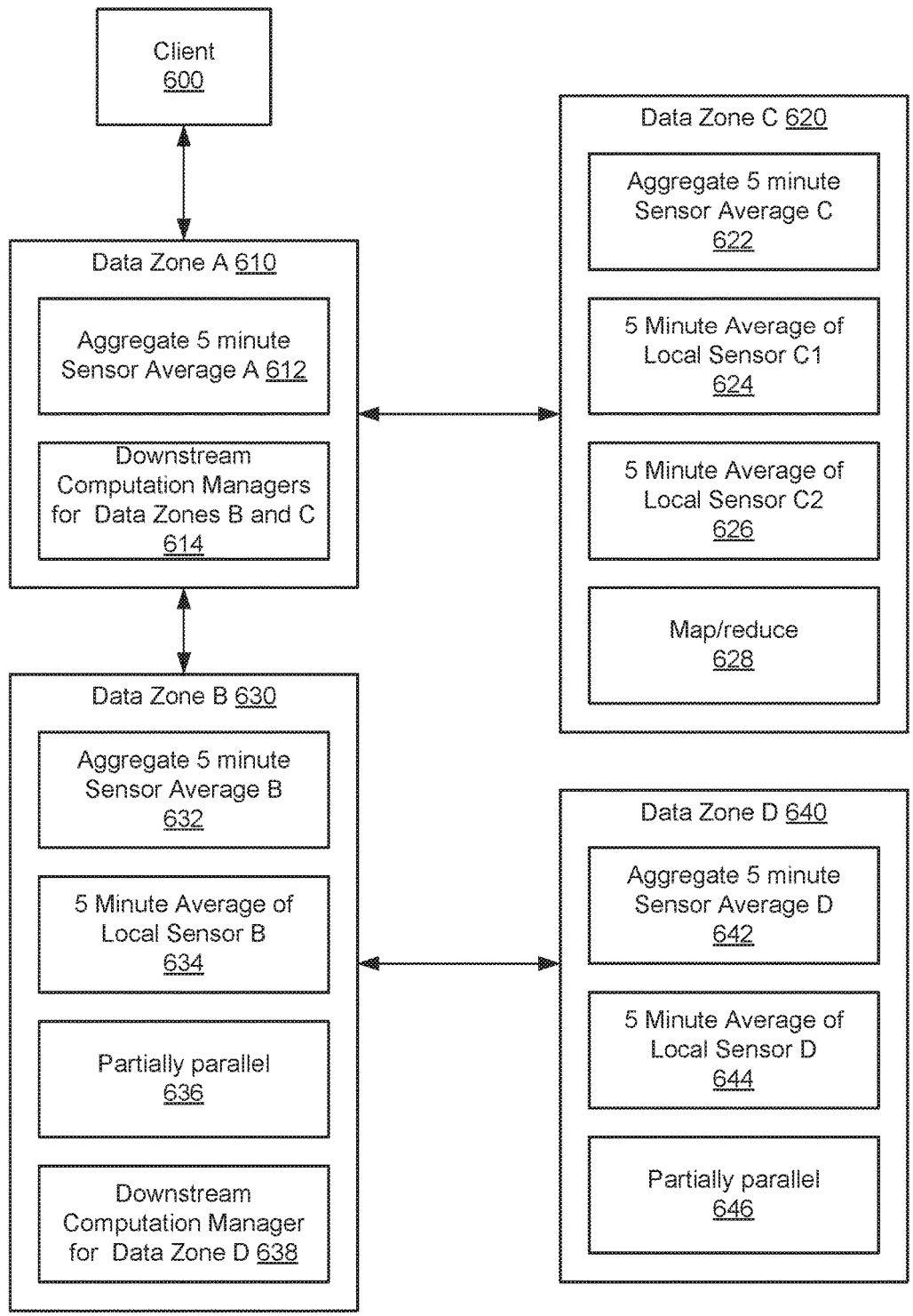
FIG. 6 shows a diagram of a example system.

To further clarify aspects of the invention, a non-limiting example is shown in FIG. 6. FIG. 6 shows a diagram of a system. Not all components of the system and each component of the system) for brevity.

EXAMPLE

Consider a system, as illustrated in FIG. 6, in which a client (600) is operably, connected to data zones A-D (610). Some of the data zones include sensors (not shown) generating locked data batches (not shown) stored on the respective data zones. More specifically, no sensor data is being stored in data zone A (610), sensor data for two sensors C1 and C2 are being stored in data zone C (620), sensor data for sensor B is being stored in data zone B (630), and sensor data for sensor D is being stored in data zone D (640). Due to privacy concerns, the sensor data is locked to each of the respective data zones.

Consider a scenario where the client (600) sends a global computation request to data zone A (610) requesting a five minute average of all of the sensor data. Averaging the data over time may anonymize the data sufficiently to allow it to be freely transmitted without violating the privacy concerns of the raw data.

In response to the request, the data zone A (610) instantiates a framework manager (not shown) associated with the request. The framework manager, in turn, instantiates an aggregate 5 minute sensor average A (612). Since none of the sensor data specified in the request is present on the data zone A (610), no local computation managers or local computations are instantiated by the framework manager. To obtain the input data for the aggregate 5 minute sensor average A (612) computation, the framework manager instantiates two downstream computations mangers (614) for data zones B and C. In turn, the respective downstream computation managers (614) instantiate computation frameworks, and corresponding framework managers, in data zone B (630) and data zone C (620), to obtain 5 minute sensor data averages of the respective zones to be used as inputs for the aggregate 5 minute sensor average A (612).

In data zone B (630), the framework manager instantiates an aggregate 5 minute sensor average B (632) computation. Since locked sensor data is stored in data zone B (630), the framework manager instantiates a 5 minute average of local sensor B (634) computation to generate a local computation result as an input to the aggregate 5 minute sensor average B (632) computation. To perform the local computation, a partially, parallel (636) computation is selected. Since a sensor in data zone D (640) is generating data, the framework manager instantiates a downstream computation manager for data zone D (638), The downstream computation manager for data zone D (638) instantiates a computation framework, and associated framework manager, to obtain the five minute average of the sensor data in zone D to be used as a second input from the aggregate 5 minute sensor average B (632).

In data zone D (640), the framework manager instantiates an aggregate 5 minute sensor average D (642) computation. Since locked sensor data is stored in data zone D (640), the framework manager instantiates a 5 minute average of local sensor D (644) computation to generate a local computation result as an input to the aggregate 5 minute sensor average D (642) computation. To perform the local computation, a partially parallel (646) computation is selected. Since no other sensor data is used as an input for the aggregate 5 minute sensor average D (642), no other local computations or downstream computation managers are instantiated.

Returning to data zone C (620), the framework manager instantiates an aggregate 5 minute sensor average C (622) computation. Since locked sensor data is stored in data zone C (620), the framework manager instantiates a 5 minute average of local sensor C1 (624) computation to generate a local computation result for the first sensor C1 and instantiates a 5 minute average of local sensor C2 (626) computation to generate a second local computation result as inputs to the aggregate 5 minute sensor average C2 (626) computation. To perform the local computations, a map/reduce (628) computation type for each of the local computations is selected. Since no other sensor data is used as an input for the aggregate 5 minute sensor average C (622), no other local computations or downstream computation managers are instantiated.

In the above discussed scenario, aggregate 5 minute sensor average C (622) computation uses the 5 minute average of local sensor C1 (624) computation and the 5 minute average of local sensor C2 (626) computation as inputs. Similarly, the aggregate 5 minute sensor average D (642) computation uses the 5 minute average of local sensor D (644) as an input.

In contrast, the aggregate 5 minute sensor average B (632) calculation uses the 5 minute average of local sensor B (634) computation and the aggregate 5 minute sensor average D (642) computation results as inputs.

The aggregate 5 minute sensor average A (612) uses the aggregate 5 minute sensor average C (622) computation and aggregate 5 minute sensor average (B) computation results as input.

To facilitate generating a global computation result, each of the aforementioned computations are keyed to only use results of similar batches as input. In this case, the key is the timestamp of each sensor data batch because the client global computation request specified a five minute average of the sensors.

The example ends.

The above example illustrates a recursive computation enabled by embodiments of the invention. More specifically, since the instantiation of a computation framework is capable of triggering the instantiation of computation frameworks in other data zones, a global framework that orchestrates performance of computations throughout the network of data zones is not required to perform data zone wide computations. Rather, each data zone of the system may be capable of instantiating computation frameworks that manage the computations in the respective data zone and trigger the instantiation of computation frameworks in other data zones.

Additionally, embodiments of the invention may enable eventually synchronous computational results to be obtained. As used herein, eventually synchronous computational results mean a computation result that would occur if all computations in a number of data zones had been performed at the same time on streaming or dynamic data sources at the same point in time but the computations were, in fact, performed at different points in time, Embodiments of the invention enable batches of data to be marked using metadata to establish groupings based on grouping criteria such as, for example, a time stamp associated with all or a portion of the data of a locked data batch. By performing computations on all of the locked data batches matching the grouping criteria, an eventually synchronous result may be obtained by recursively establishing computing frameworks that perform successive computations on locked data batches and/or computation results matching the grouping criteria.

Further embodiments of the invention may improve the performance of computations in a network environment by decentralizing the control of the computations performed in the network environment. In one or more embodiments of the invention, the computations may be decentralized by delegating: (i) selection of where computations will be performed and (ii) selection of the computation type used to obtain the computation result. By decentralizing control of the computations performed across data zones, embodiments of the invention may reduce the computing resource cost of performing the computations by allowing each computation framework to make the corresponding selections when instantiating computations. For example, computation frameworks may select computation types based on a type of the data or a format of the data that minimizes the computing resource cost of obtaining the computation result.

Still further, embodiments of the invention address the problem of computational resource cost scaling in a network environment by delegating the implementation of computations to data zones implementing the computations. Computing devices in a network have limited available information regarding the structure of the network, the format of data stored on the network, the type of data stored on the network, and the content of the data stored on the network. Delegating the implementation of specific computations across computing devices of data zones of the network of data zones in a dynamic manner using a set of rules for establishing computational frameworks reduces the impact of computation resource cost scaling in the network. In one or more embodiments of the invention, the set of rules includes: an order of instantiating component of a computation framework and criteria on which the instantiation of each component is based. In one or more embodiments of the invention, instantiating different components of a computational framework are based on different sets of rules. For example, instantiating local computations may be based on a different set of rules than establishing downstream computation managers.

While the above discussion highlighted features and/or uses of the invention, embodiments of the invention are not limited to similar uses and are not required to include similar features without departing from the invention. For example, some embodiments of the invention may have different, fewer, or more uses without departing from the invention.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This number convention means that the data structure may include any of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device of a first data zone, comprising:
a persistent storage comprising a first locked data batch of the first data zone; and
a processor programmed to:
obtain an upstream computation request;
instantiate a first computation framework to process the first locked data batch based on a global data batch specified in the upstream computation request;
instantiate a downstream computation manager to manage a downstream computation;
instantiate, by the downstream computation manager, a second computation framework in a second computing device of a second data zone to process a second locked data batch of the second data zone;
obtain a first computation result from the second computation framework; and
generate a second computation result using:
the first computation framework,
the first locked data batch, and
the first computation result,
wherein the first locked data batch and the first computation result match a same grouping criteria.

2. The computing device of claim 1, wherein the second locked data batch cannot be transmitted to the computing device.

3. The computing device of claim 1, wherein the upstream computation request is a global computation request generated by a client.

4. The computing device of claim 1, wherein the upstream computation request is a downstream computation request that was instantiated by a third computation framework.

5. The computing device of claim 1, wherein the first computation framework comprises:
a local computation that generates a first computation result stored on the persistent storage,
wherein the local computation is based on the global data batch of the upstream computation request.

6. The computing device of claim 5, wherein the global data batch specifies:
the first locked data batch, and
the second locked data batch.

7. The computing device of claim 5, wherein the global data batch specifies a data type of the first locked data batch, wherein a data type of the second locked data batch is the same as the data type of the first locked data batch.

8. The computing device of claim 1, wherein the processor is further programmed to:
before instantiating the second computation framework:
determine, by the downstream computation manager, a first computing resource cost of processing the second locked data batch using the second computing device;
determine, by the downstream computation manager, a second computing resource cost of processing the second locked data batch using a third computing device of a third data zone; and
select, by the downstream computation manager, to instantiate the second computing framework in the second computing device based on the first computing resource cost and the second computing resource cost.

9. The computing device of claim 1, wherein instantiating, by the downstream computation manager, the second computation framework in the second computing device of the second data zone to process the second locked data batch of the second data zone comprises:
generating a downstream computation request; and
sending the generated downstream computation request to the second computing device.

10. The computing device of claim 9, wherein the downstream computation request comprises a description of a second local computation to be performed by the second computing device.

11. The computing device of claim 9, wherein the downstream computation request specifies a type of computation to be performed as a second local computation to be performed by the second computing device.

12. The computing device of claim 9, wherein the downstream computation request specifies a plurality of types of computations, wherein the downstream computation request specifies that one of the plurality of types of computations is to be performed as a local computation of the second computing device.

13. The computing device of claim 1, wherein instantiating the computation framework to process the first locked data batch based on the global data batch specified in the upstream computation request comprises:
determining a format of the first locked data batch;
determining a computational cost of each of a plurality of computation types for the format of the first locked data batch;
determining a computation type of the plurality of computation types that has a relatively low computation cost of the computational costs of each of the plurality of computation types; and
instantiating a local computation of the determined computation type using the locked data batch.

14. The computing device of claim 13, wherein the local computation is one selected from a group consisting of a map/reduce computation, a split-apply-combine computation, and a partially parallel computation.

15. The computing device of claim 1, wherein the first data zone is a first cloud computing environment comprising the computing device.

16. The computing device of claim 15, wherein the second data zone is a second cloud computing environment comprising the second computing device.

17. The computing device of claim 1, wherein generating the second computation result comprises:
generating a third computation result based on the first locked data batch;
generating the second computation result using the third computation result and the first computation result; and
marking the second computation result as being contemporaneous to the first computation result.

18. A method of operating a computing device of a first data zone, comprising:
obtaining, by the computing device, an upstream computation request;
instantiating, by the computing device, a first computation framework to process a first locked data batch based on a global data batch specified in the upstream computation request, wherein the first locked data batch is stored on a persistent storage of the computing device;
instantiating, by the computing device, a downstream computation manager on the computing device to manage a downstream computation;
instantiating, by the downstream computation manager of the computing device, a second computation framework in a second computing device of a second data zone to process a second locked data batch of the second data zone;
obtaining a first computation result from the second computation framework; and
generating a second computation result using:
the first computation framework,
the first locked data batch, and
the first computation result,
wherein the first locked data batch and the first computation result match a same grouping criteria.

19. A non-transitory computer readable medium comprising computer readable program code, which when executed by a computer processor enables the computer processor to perform a method for operating a computing device of a first data zone, the method comprising:
obtaining, by the computing device, an upstream computation request;
instantiating, by the computing device, a first computation framework to process a first locked data batch based on a global data batch specified in the upstream computation request, wherein the first locked data batch is stored on a persistent storage of the computing device;
instantiating, by the computing device, a downstream computation manager on the computing device to manage a downstream computation;
instantiating, by the downstream computation manager of the computing device, a second computation framework in a second computing device of a second data zone to process a second locked data batch of the second data zone;

obtaining a first computation result from the second computation framework; and generating a second computation result using:
 the first computation framework,
 the first locked data batch, and
 the first computation result, wherein the first locked data batch and the first computation result match a same grouping criteria.

20. The non-transitory computer readable medium of claim 19, wherein the second locked data batch cannot be transmitted to the computing device.

\* \* \* \* \*